(12) United States Patent  (10) Patent No.: US 6,347,997 B1
Armstrong  (45) Date of Patent: *Feb. 19, 2002

(54) ANALOG CONTROLS HOUSED WITH ELECTRONIC DISPLAYS

(76) Inventor: Brad A. Armstrong, P.O. Box 1419, Paradise, CA (US) 95967

(*) Notice: Subject to any disclaimer, the term of this patent is extended or adjusted under 35 U.S.C. 154(b) by 0 days.

This patent is subject to a terminal disclaimer.

(21) Appl. No.: 09/568,662

(22) Filed: May 10, 2000

Related U.S. Application Data

(63) Continuation-in-part of application No. 08/942,450, filed on Oct. 1, 1997, now Pat. No. 6,102,802.

(51) Int. Cl.⁷ .................................................. G09G 5/00
(52) U.S. Cl. ......................................................... 463/37
(58) Field of Search ................. 463/36, 37; 273/143 B; 345/156, 159; 200/513

(56) References Cited

U.S. PATENT DOCUMENTS

| | | | | |
|---|---|---|---|---|
| 4,158,759 A | * | 6/1979 | Mason ........................ 219/506 |
| 4,314,227 A | | 2/1982 | Evertoff |
| 4,406,217 A | * | 9/1983 | Oota ........................... 99/280 |
| 4,724,292 A | * | 2/1988 | Ichikawa .................... 219/518 |
| 5,182,796 A | * | 1/1993 | Shibayama et al. ......... 395/156 |
| 5,200,597 A | | 4/1993 | Eastman |
| D342,740 S | * | 12/1993 | Parker ........................ D14/218 |
| 5,333,057 A | * | 7/1994 | Morikawa et al. .......... 358/296 |
| 5,355,352 A | * | 10/1994 | Kobayashi et al. ......... 368/281 |
| 5,365,494 A | * | 11/1994 | Lynch ......................... 368/10 |
| 5,510,812 A | * | 4/1996 | Omara et al. ............... 345/161 |
| 5,673,237 A | * | 9/1997 | Blank .......................... 368/10 |
| 5,684,759 A | * | 11/1997 | Huang et al. ................ 368/10 |
| 5,689,285 A | * | 11/1997 | Asher .......................... 345/161 |
| 5,764,219 A | * | 6/1998 | Rutledge et al. ............ 345/159 |
| 5,847,305 A | * | 12/1998 | Yoshikawa et al. ........... 84/634 |
| 5,895,471 A | * | 4/1999 | King et al. .................. 707/104 |
| 5,917,779 A | * | 6/1999 | Ralson et al. ................. 368/83 |
| 5,948,066 A | * | 9/1999 | Whalen et al. ............. 709/229 |
| 5,974,238 A | * | 10/1999 | Chase, Jr. ................... 395/200 |
| 6,102,802 A | * | 8/2000 | Armstrong .................... 463/37 |
| 6,112,014 A | * | 8/2000 | Kane .......................... 395/115 |
| 6,118,979 A | * | 9/2000 | Powell ....................... 455/31.2 |
| 6,157,935 A | * | 12/2000 | Tran et al. ................... 707/503 |
| 6,178,338 B1 | * | 1/2001 | Yamagishi et al. ......... 455/566 |
| 6,185,158 B1 | * | 2/2001 | Ito et al. ....................... 368/37 |
| 6,198,948 B1 | * | 3/2001 | Sudo et al. ................. 455/566 |

FOREIGN PATENT DOCUMENTS

| | | |
|---|---|---|
| JP | 5-87760 | 11/1993 |
| JP | 7302159 | 11/1995 |

* cited by examiner

Primary Examiner—Scott A. Smith
Assistant Examiner—John Paradiso

(57) ABSTRACT

Devices for controlling imagery shown by a display, and including an analog sensor for creating a varying analog value according to varying depression applied by a finger of a human user to the analog sensor. Multiple analog sensors are sometimes utilized. In one preferred embodiment the analog sensor(s) includes a resilient dome cap for providing tactile feedback to the finger depressing the analog sensor. Circuitry within a housing is connected to the analog sensor for reading the varying analog value from the analog sensor and causing representative varying the imagery shown by the display. The devices can be individually structured as electronic game controllers/systems, telephones, pagers, electronic books, web browsers, global positioning receivers, ovens, coffee makers and personal digital assistants (PDA) to name a few.

51 Claims, 18 Drawing Sheets

ANALOG CONTROLS HOUSED WITH ELECTRONIC DISPLAYS

CROSS-REFERENCE TO RELATED APPLICATIONS

This is a Rule 1.53(b) continuation-in-part of U.S. application Ser. No. 08/942,450 filed Oct. 1, 1997, now U.S. Pat. No. 6,102,802.

A claim under 35 U.S.C. 120 is hereby made to the benefits of the earlier filing dates of my following applications: U.S. Non-Provisional application Ser. No. 08/942,450 filed Oct. 10, 1997, titled GAME CONTROLLER WITH ANALOG PRESSURE SENSOR(S), now U.S. Pat. No. 6,102,802; U.S. Provisional application No. 60/133,682 filed May 11, 1999, titled ANALOG CONTROLS HOUSED WITH ELECTRONIC DISPLAYS; U.S. Non-Provisional application Ser. No. 09/122,269 filed Jul. 24, 1998, titled VARIABLE-CONDUCTANCE SENSOR WITH ELASTOMERIC DOME-CAP, now U.S. Pat. No. 6,135,886; U.S. Provisional application No. 60/135,085 filed May 20, 1999, titled KEYBOARD WITH DEPRESSIBLE ANALOG SCROLL CONTROL; pending U.S. Non-Provisional application version thereof, application Ser. No. 09/563,109 filed May 2, 2000 also titled KEYBOARD WITH DEPRESSIBLE ANALOG SCROLL CONTROL; U.S. Non-Provisional application Ser. No. 09/167,314 filed Oct. 6, 1998 and entitled COMPUTER MOUSE WITH ENHANCED CONTROL BUTTON(S) (as amended), now U.S. Pat. No. 6,198,473, and U.S. Pat. No. 6,222,525 filed as an application on Jul. 5, 1996.

BACKGROUND OF THE INVENTION

1. Field of the Invention

The present invention involves an electronic device including a combination of a electronic visual display in or on a housing, electronic circuitry in the housing, and at least one analog sensor comprising a finger or thumb depressible surface with associated analog pressure-sensitive element. The analog pressure-sensitive element is for output of a signal of variable value utilized by the circuitry to control or manipulate one or more functions of the electronic device. The resultant control manipulation from the analog sensor is in some manner indicated or displayed on the display at least at the time the user is pressing the depressible surface, thereby the human user is provided data related to a new state or setting brought about, or in the process of being brought about, by manipulating the variable value of the analog sensor through controlled varied amounts of finger pressure applied to the depressible surface of the analog sensor. Based upon the feedback on the display, the user may terminate, increase or decrease the finger pressure on the depressible surface of the analog sensor.

2. Brief Description of Related Prior Art

Displays, housings, electronics and analog output buttons do exist in the prior art. The present invention, however, does not exist in the prior art and is of significant and substantial value as will become fully appreciated with continued reading.

SUMMARY OF THE INVENTION

The present invention, at least from one viewpoint, is an electronic device, which may take many forms as herein disclosed, but all including a combination of a electronic visual display in or on a housing, electronic circuitry in the housing, and including at least one human user depressible surface with associated analog pressure-sensitive element for output of a signal of variable value utilized by the circuitry to control or manipulate a function(s) of the device. The at least one analog pressure-sensitive element receives pressure applied by a user's finger (the word finger or fingers or digit can be herein used to include the thumb) to the depressible surface, varied pressure applied by the user determines varied value of the signal, and this allows the user to select rates of change, the rate of change in some way being displayed on the display to allow the user to choose more or less pressure, or to terminate pressure on the finger depressible surface. The resultant control manipulation from the analog variable value is in some manner indicated or made visually detectable as feedback on the display at least at the time the analog sensor is being depressed, and this to allow the intelligent application of finger pressure by the user to the analog sensor. Some examples of functions which can be manipulated, controlled or changed, and at variable rates dependant upon user applied pressure, include menus or lists displayed on telephones, television program menus and the like, numeric settings such as related to time, temperature or number of units, such as number of copies to be made by a photocopy machine for example. Some additional examples of electronic devices described in accordance with the invention include desktop displays, hand-held game systems, personal digital assistants (PDA), electronic books, wireless web browsers, time display clocks/watches, cooking ovens, pagers, remote controller such as used with TVs stereos, etc., and coffee makers all with displays. The displays can be CRT, non-CRT, LCD, LED or any other suitable type and in many applications are seven-element numeric displays such as are commonly used to display number of units or time.

An object of the present invention is to provide an electronic device including a combination of an electronic visual display in or on a housing, electronic circuitry in the housing, and at least one analog sensor comprising a finger or thumb depressible surface with associated analog pressure-sensitive element for output of a signal of variable value utilized by the circuitry to manipulate one or more functions of the electronic device at varied rates, the manipulation in some manner indicated on the display at least at the time the user is pressing the depressible surface, thereby the human user is provided data allowing the intelligent increase, decrease or termination of the finger pressure to effect a rate of change.

BEST MODE FOR CARRYING OUT THE INVENTION

Figure 1:
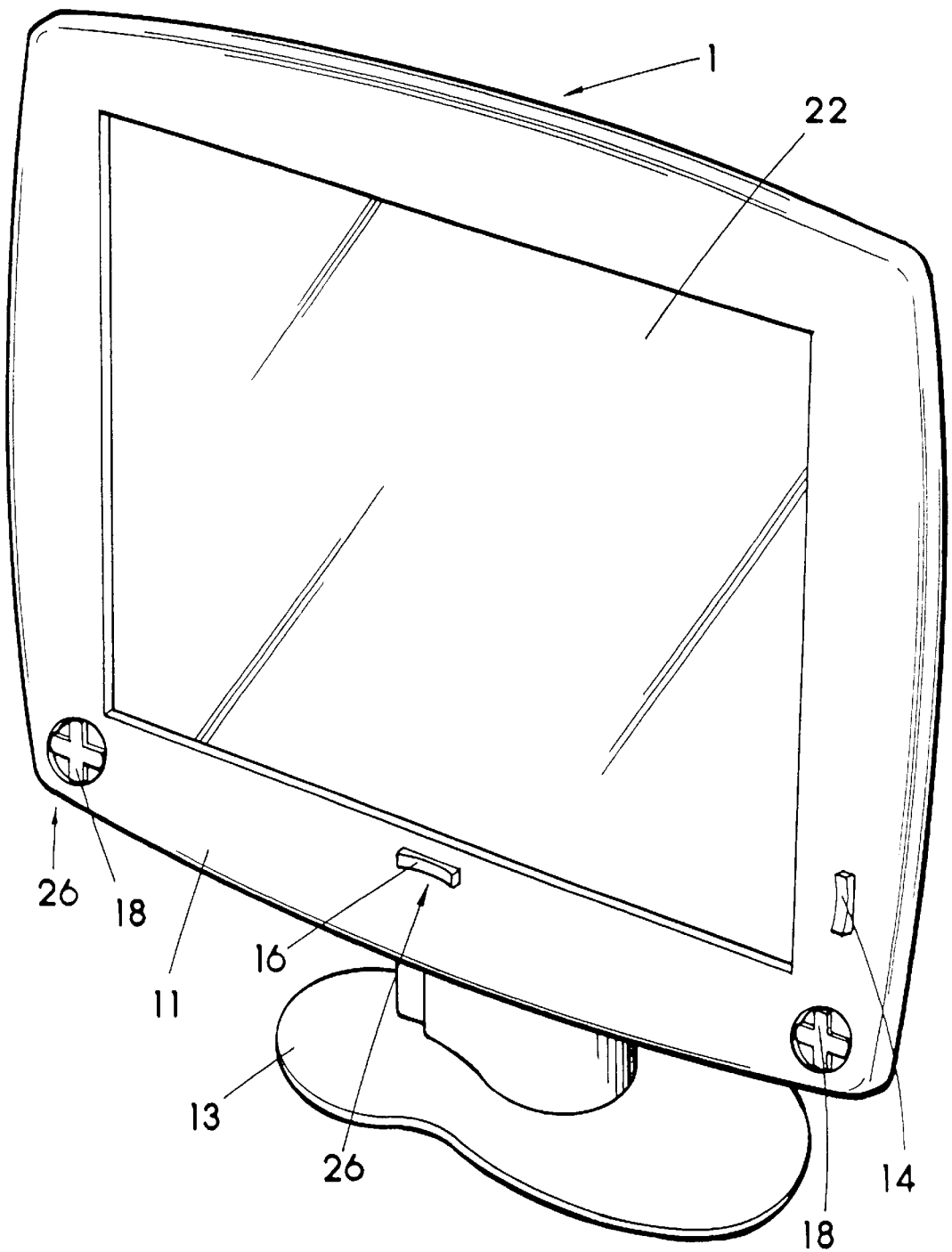
FIG. 1 shows a desktop display supported by a desk stand having a housing and a display screen mounted within the housing. The housing is shown having 4-way and 2-way analog rockers.

Herein incorporated by reference is my pending U.S. Provisional application No. 60/133,682 filed May 11, 1999, titled ANALOG CONTROLS HOUSED WITH ELECTRONIC DISPLAYS for the teachings of the present invention therein.

Also herein incorporated by reference is my pending U.S. Non-Provisional application Ser. No. 08/942,450 filed Oct. 1, 1997, title GAME CONTROLLER WITH ANALOG PRESSURE SENSOR(S), now U.S. Pat. No. 6,102,802; this disclosure incorporated by reference primarily for the positive teachings therein of structuring and methods of use and the reading of analog sensors such as elastomeric dome-cap style positioned in end-use for depression directly or in-directly by a human digit with varying degrees of force. Additionally, 4-way analog rockers, 2-way analog rocker buttons and individual analog push buttons are described in detail in my disclosure titled GAME CONTROLLER WITH ANALOG PRESSURE SENSOR(S).

Also herein incorporated by reference is my pending U.S. Non-Provisional application Ser. No. 09/122,269 filed Jul. 24, 1998, titled VARIABLE-CONDUCTANCE SENSOR WITH ELASTOMERIC DOME-CAP, now U.S. Pat. No. 6,135,886; this disclosure incorporated by reference primarily for the positive teachings therein of structuring and methods of use and the reading of analog sensors such as elastomeric dome-cap sensors positioned in end-use for depression directly or in-directly by a human digit with varying degrees of force, and for data related to possible digital bit assigning to various states or levels of conductivity of the analog sensors wherein the differing bit assignment can be used indicative of differing pressures applied by the human user to the analog or pressure-sensitive variable-conductance sensor(s).

Also herein incorporated by reference is my U.S. Pat. No. 5,999,084 issued Dec. 7, 1999 titled VARIABLE-CONDUCTANCE SENSOR; this Patent incorporated by reference primarily for the positive teachings therein of structuring and methods of use and the reading of analog sensors as with my packaged type such as with a conductive dome providing a tactile feedback, circuit elements and pressure-sensitive variable-conductance material engaged or engagable with the circuit elements to provide analog output or the like; the sensor positioned in end-use for depression directly or in-directly such as by a human digit with varying degrees of force. This sensor provides tactile feedback at approximate activation and deactivation of the analog pressure sensitive material, the disclosure describing the benefits which can be gained with an analog sensor providing bi or uni-directional tactile feedback.

Also herein incorporated by reference is my pending U.S. Provisional application No. 60/135,085 filed May 20, 1999 titled KEYBOARD WITH DEPRESSIBLE ANALOG SCROLL CONTROL. This provisional disclosure also includes a modified USB software code on 3.5" floppy which although specifically directed to my Mouse With Analog Buttons of application Ser. No. 09/167,314, it can clearly be readily modified to operate with the present invention, although those skilled in the art will agree numerous suitable software codes can be readily applied with little modification to interface between the hardware of a keyboard in accordance with the invention and software, ROM, hardware, etc. of a computer to be manipulated by the present keyboard. The modified code is one which includes a bit assignment for each scroll direction and associated with each button associated with that direction, and which is arranged along with electronics to repeat the direction-identifying code at a variable rate of repeat when the user is depressing the associated button, the rate of repeat (scrolling) indicative of the read value of the analog sensor, i.e., pressure-sensitive variable-conductance material and the amount of depressive force the human user is applying thereto. Greater details of this Variable-Rate On/Off Messaging System are provided in my pending U.S. Provisional application filed May 10, 1999, application Ser. No. 60/133, 319 and herein incorporated by reference, and this for the teaching of the varied "ON" or "OFF" signal rate of sending, the rate of the simple message being dependent or resultant of the amount of pressure applied or the varied value single of a pressure-sensitive analog element. Certainly other suitable codes and the like can be utilized within the scope of the invention. For more data regarding software or firmware codes, go to cypress.com on the world wide web. Also incorporated herein is my pending U.S. Non-Provisional application version of the Provisional appli. No. 60/135,085 filed May 20, 1999 titled KEYBOARD WITH DEPRESSIBLE ANALOG SCROLL CONTROL, the Non-Provisional application Ser. No. (to be filled in later) filed May 2, 2000 also titled KEYBOARD WITH DEPRESSIBLE ANALOG SCROLL CONTROL.

Also herein incorporated by reference is my U.S. Non-Provisional application Ser. No. 08/677,378 filed Jul. 5, 1996 titled IMAGE CONTROLLERS AND SENSORS (as amended) now U.S. Pat. No. 6,222,525, particularly, but not exclusively, for the pressure-sensitive analog sensors with break-over and active tactile feedback and the like described therein.

Also herein incorporated by reference is my U.S. Non-Provisional application Ser. No. 09/148,806 filed Sep. 4, 1998, title REMOTE CONTROLLER WITH ANALOG BUTTON(S), now U.S. Pat. No. 6,208,271. This disclosure incorporated by reference primarily for the positive teachings therein of structuring and methods for dual purpose sensors capable of both analog and On/Off modes.

Also herein incorporated by reference is U.S. Pat. No. 4,314,227 issued Feb. 2, 1982, this patent incorporated only for its positive teachings of membrane or sheet based analog sensors.

With reference now to the drawings for a more detailed description.

FIGS. 1–15 indicate various consumer electronic devices in accordance with the invention and having a housing 11, a display 22 associated with housing 11, i.e. mounted on or in the housing 11, and at least one analog sensor 26 having a depressible surface area associated with the display. Analog sensors 26 can be ganged in 2-way and 4-way units such as rockers 14, 16 and 18, or can be in single button or surface form such as shown at 19 in some of the drawings. The analog sensor 26 in a preferred structure has a pressure-sensitive variable-conductance material for providing a variable signal varying with differing amounts of user finger applied pressure, however, the associated circuitry can be structured to additionally read a rapid press and release on the sensor as a momentary-On used to supply a single increment signal, e.g., single step numeric increase/decrease or scroll up/down. As the user's finger depresses the sensor material, its conductivity is read by associated circuitry, such as a microcontroller, reading the time of charge or discharge of a capacitor as determined by the conductivity of the analog sensor material. The devices shown in FIG. 1–15 already have internal microcontrollers or even more complex circuitry, and one of average skill in the art can readily apply the analog buttons/sensors/analog rockers/analog membrane sensors to the indicated art with an understanding of this disclosure.

FIG. 1 shows a desktop display or monitor 1 supported by a desk stand 13 having a housing 11 and a display 22 mounted within housing 11. The display 22 can be either a CRT or Non-CRT technology or any suitable display. U.S. Class 345 contains many prior art patents describing CRT and Non-CRT display for those wishing more information thereon. At the lower left corner of the housing is shown a 4-way analog rocker 18. Also shown is a 4-way analog rocker 18 in the lower right hand corner to illustrate various possible locations for 4-way analog rockers 18. Shown at the lower center of the housing 11 is a 2-way analog rocker 16 which can serve as an X axis or horizontal control or scroller, and at the right side of housing 11 is shown a 2-way analog rocker 14 which can serve as a Y axis or vertical control or scroller. The rocker depressible surfaces operate analog sensors 26 or from another view form components thereof.

For all embodiments shown herein, the 4-way analog rockers 18 can each also serve as X axis or horizontal control, and as Y axis or vertical control or scroller manipulated by the user's thumb and or fingers (digits). It is anticipated that the 4-way analog rocker serves largely the same purposes as two perpendicular 2-way analog rockers, and while the embodiments shown herein demonstrate both 2-way and 4-way rockers, for most purposes an embodiment will need only one 4-way rocker or one or more 2-way rockers, or an equivalent number of single analog push buttons.

Figure 2:
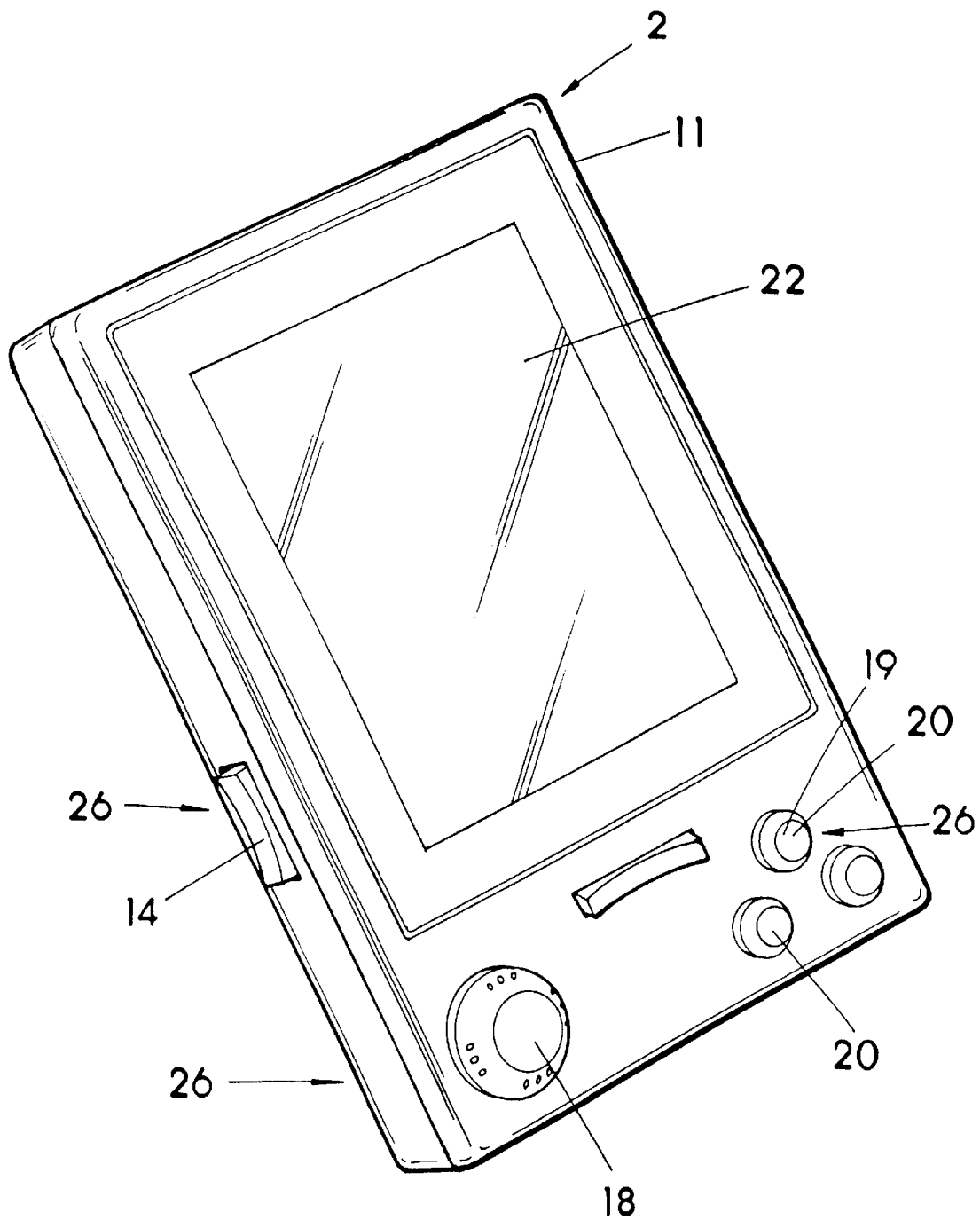
FIG. 2 shows a hand-held game system, in the nature of a Nintendo GAMEBOY (tm) unit, or future variants of such, or the like and modified in accordance with the present invention. A display and 4-way and 2-way analog rockers and individual analog buttons are shown in a housing.

FIG. 2 shows a hand-held game system 2, in the nature of a Nintendo GAMEBOY unit, or future variants of such, or the like and modified in accordance with the present invention. U.S. Classes 273 & 463 contain many prior art patents describing electronic game systems for those wishing more information thereon. Shown in FIG. 2 is a housing 11 and a display 22 mounted within the housing. At the lower left corner of the housing is shown a 4-way analog rocker 18. Shown at the lower center of the housing is a 2-way analog rocker 16 which can serve as an X axis, horizontal control or scroller, and at the left, on the narrow side of the housing, is shown a 2-way analog rocker 14 which can serve as a Y axis, vertical control or scroller. Also shown, at the lower right hand corner are buttons 19 and 20, 3 buttons are shown for example illustrating that one or more can be applied. The analog button(s) 19 can be used for variable control of imagery or other functions dependant upon applied (the amount) digit pressure. Button 20 in this example functions as a momentary-On non-analog switch. It should be recognized that the analog sensors 26 can also function as momentary-On, On/Off non-analog switches, and the embodiments herein may at times be advantaged by analog functionality and at other times by On/Off switch functionality.

The positions of the shown analog rockers and buttons on this and all figures are for example to illustrate various possible locations for analog rockers and/or buttons associated with displays in accordance with the invention.

Figure 3:
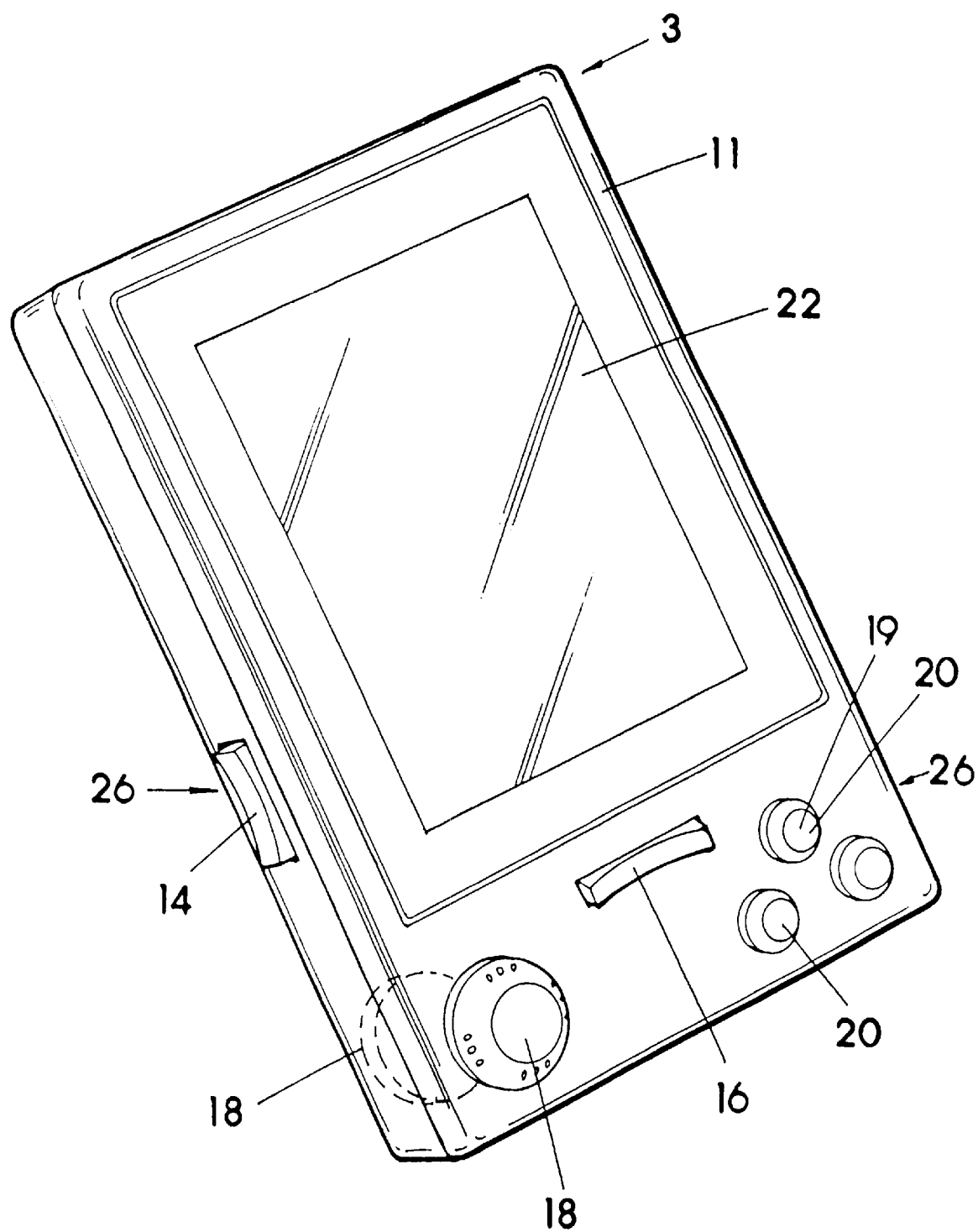
FIG. 3 shows a personal digital assistant (PDA), in the nature of a PALM PILOT by 3COM or the like and modified in accordance with the present invention, including a housing, a display screen mounted within the housing, and 2-way and 4-way analog rockers, and buttons.

FIG. 3 shows a personal digital assistant (PDA) 3, in the nature of a PALM PILOT by 3COM or the like and modified in accordance with the present invention. U.S. Class 395 contains prior art patents describing personal digital assistants for those wishing more information thereon. Shown in FIG. 3 is a housing 11 and a display 22 mounted within housing 11. At the lower left corner of the housing is shown a 4-way analog rocker 18. Shown at the lower center of the housing is a 2-way analog rocker 16 which can serve as an X axis control or scroller, and at the left, on the side of the housing, is shown a 2-way analog rocker 14 which can serve as a Y axis control or scroller. Also shown, at the lower right hand corner are at least on analog button 19, and at least one button 20 capable of serving as an On/Off switch. The analog buttons can be used for variable control of imagery or other functions. The positions of the shown analog rockers and buttons on this and all figures are for example to illustrate various possible locations for analog rockers and/or buttons associated with display in accordance with the invention. Also shown in broken lines is a 4-way analog rocker 18 on the back side of housing 11 which may be located anywhere on the back side of housing 11, as could also 2-way rockers and analog buttons. The placement of the 2-way analog rockers, 4-way analog rockers or single analog push button to the back side of the housing can be applied to any of the embodiments herein shown, and would allow viewing of the display while hold the housing with the fingers on the back side of the housing and manipulating the rockers and or buttons.

Figure 4:
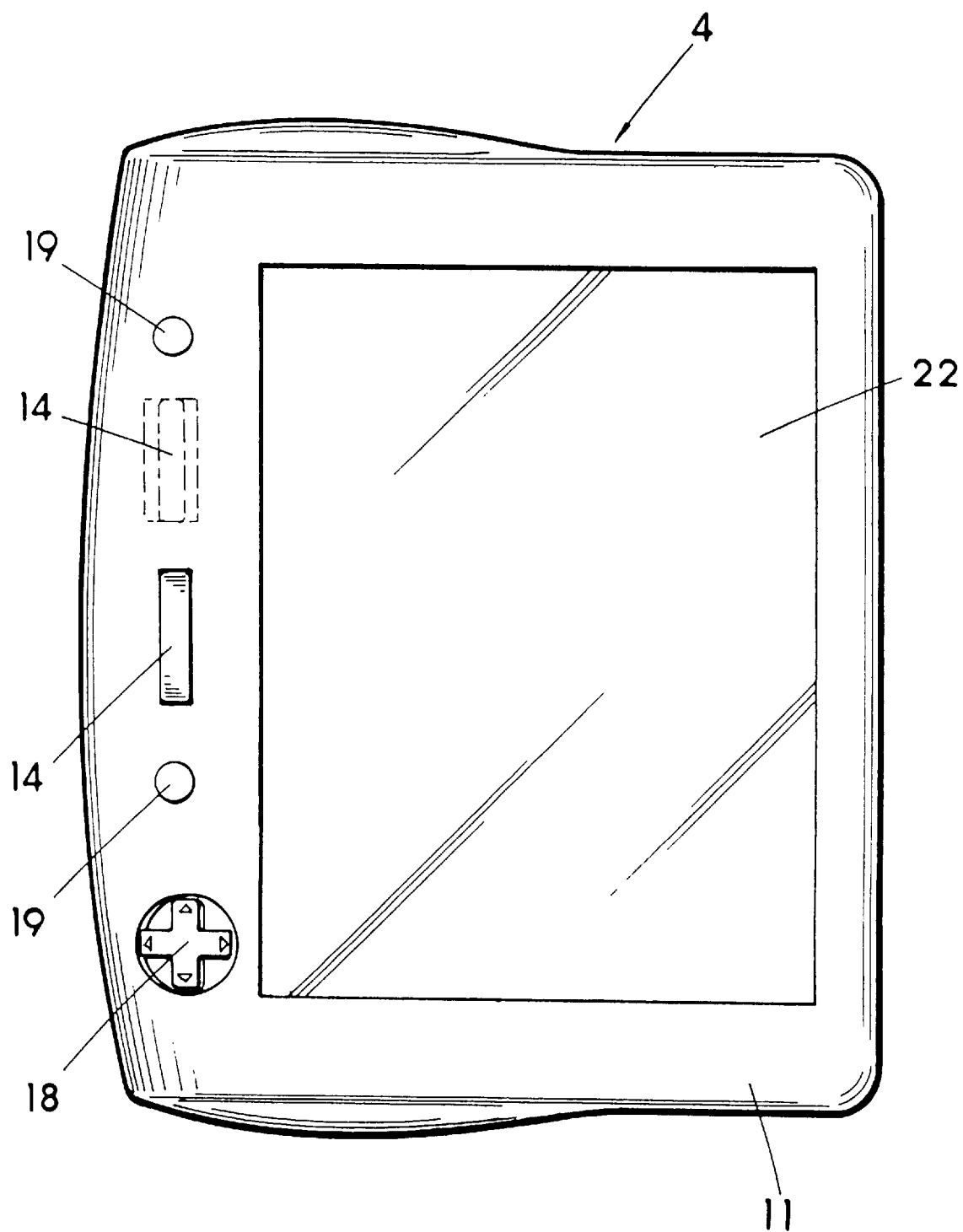
FIG. 4 shows an electronic book or the like and modified in accordance with the present invention. Shown is a housing and a display screen mounted within the housing, and 4-way and 2-way analog rocker buttons.

FIG. 4 shows an electronic book 4 or the like and modified in accordance with the present invention. U.S. Class 434 contains prior art patents describing electronic books for those wishing more information thereon. Shown in FIG. 4 is a housing 11 and a display 22 mounted within the housing 11. At the lower left corner of the housing is shown a 4-way analog rocker 18. Shown at the left center of the housing is a 2-way analog rocker 14 which can serve as an Y axis or vertical control or scroller. Although not shown, a 2-way X axis or horizontal analog rocker can be mounted any place on the housing. Also shown in broken lines is a 2-way analog rocker 14 on the back side of the housing 11 which may be located anywhere on the back side of the housing. The analog rockers can be used for variable control of imagery or other functions. Also shown are two analog buttons 19.

Figure 5:
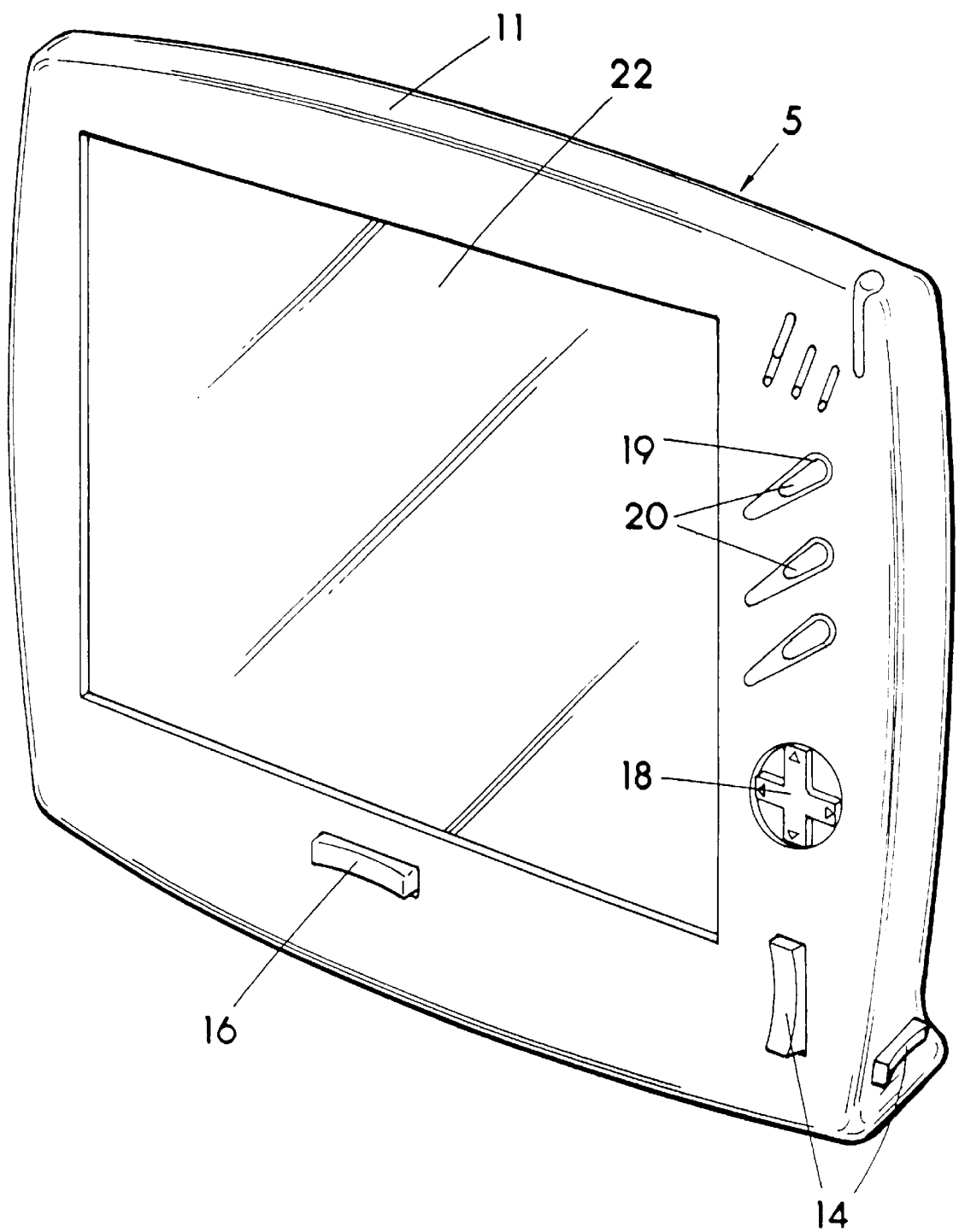
FIG. 5 shows a wireless internet web browser or the like and modified in accordance with the present invention. Shown is a housing and a display screen mounted within the housing, and various analog buttons.

FIG. 5 shows a wireless internet web browser 5 or the like for browsing the world wide web and modified in accordance with the present invention. U.S. Class 345 also contains some prior art patents describing web browser and the like for those wishing more information thereon. Shown in FIG. 5 is a housing 11 and a display 22 mounted within the housing 11. On the right hand side of the housing is shown a 4-way analog rocker 18. Shown at the lower right front of the housing is a 2-way analog rocker 14 which can serve as an Y axis or vertical control or scroller. Also shown in the lower front center is a 2-way X axis or horizontal analog rocker 16 can be mounted any place on the housing. Also shown on the lower right side of the housing is a 2-way analog rocker 14 which can serve as a Z axis or "zoom" control which is not shown in the other drawing figures but which can clearly be applied thereto. Also shown are analog and simple switch buttons 19 and 20.

Figure 6:
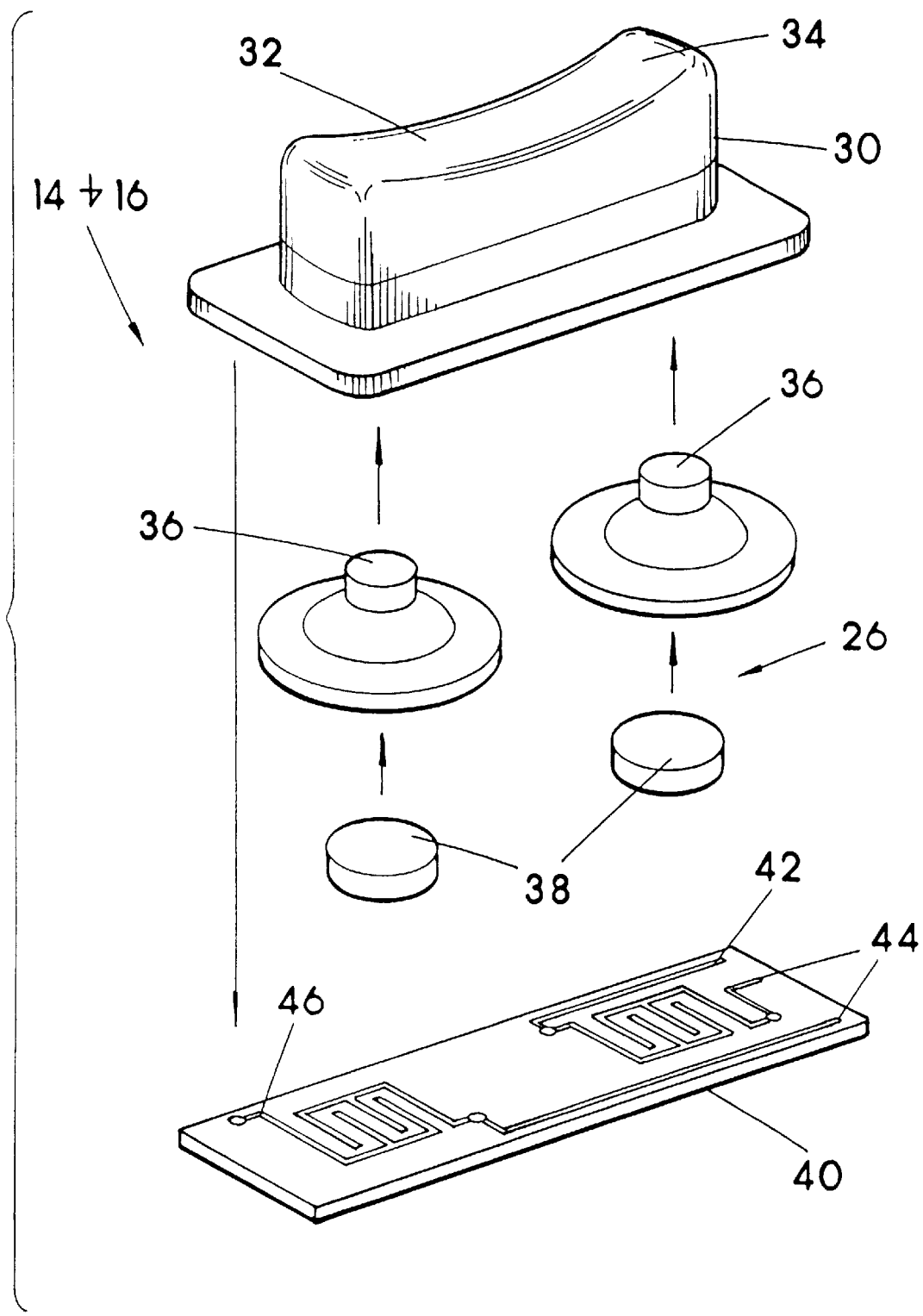
FIG. 6 shows an exploded view of a 2-way analog rocker as may be employed with the invention.

FIG. 6 shows an exploded view of a 2-way analog rocker 14 or 16 as may be employed in embodiments of the invention as an analog sensor 26. Shown is a circuit board 40 with exposed interdigitated circuit traces 44 as a common, 42, 46 as outs or switch legs; two "pills" or disks of pressure-sensitive variable-conductance material 38; two rubber-dome caps 36 positioned beneath a 2-way rocker member 30. The 2-way rocker member 30 has a first depressible surface 32 and a second depressible surface 34. Each finger depressible surface 32, 34 for functioning by depression with the shown respective dome-caps 36, pills 38 and the circuit traces 42, 44, 46. It does not require a rocker to electrically achieve that which is accomplished with a 2-way or 4-way, 14, 16, 18 rocker, as two separate or four separate depressible buttons or surfaces (see FIG. 2 at 19) can be used although I prefer the rocker format for ease of locating desired direction oriented depressible surfaces simply by feel without having to look.

Figure 7:
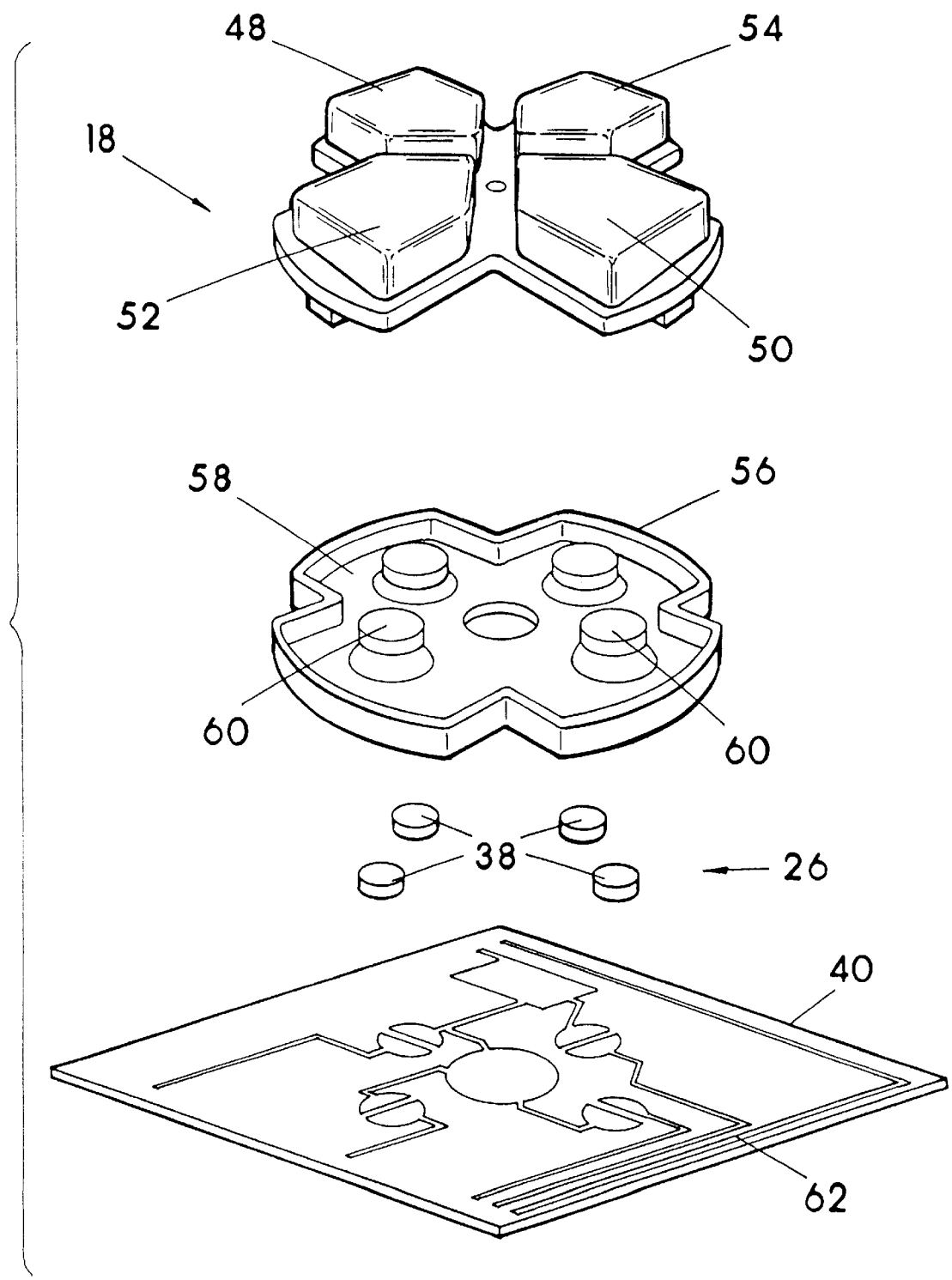
FIG. 7 shows an exploded view of a 4-way analog rocker as may be employed with the invention.

FIG. 7 shows an exploded view of a 4-way analog rocker 18 as may be employed in the embodiments of the current invention. Shown is a circuit board 40 with exposed circuit traces indicated at 62 for four sensors 26. Also shown are four pressure-sensitive variable-conductance pills or elements 38; a 4-way rubber-dome cap unit 56 with each of the 4 dome caps 60 support by base 58 over a "pill" or disk of pressure-sensitive variable-conductance material 38; and a 4-way rocker member having a first surface 48, a second surface 50, and third surface 52, and a fourth depressible surface 54. Each surface for functioning by depression with the shown respective dome-caps 60, pills 38 and circuitry 62 of the board 40. This disclosure discloses that which can be viewed from numerous points, but clearly herein described are improved methods, structures, and also methods of manufacturing in accordance with the present invention.

Figure 8:
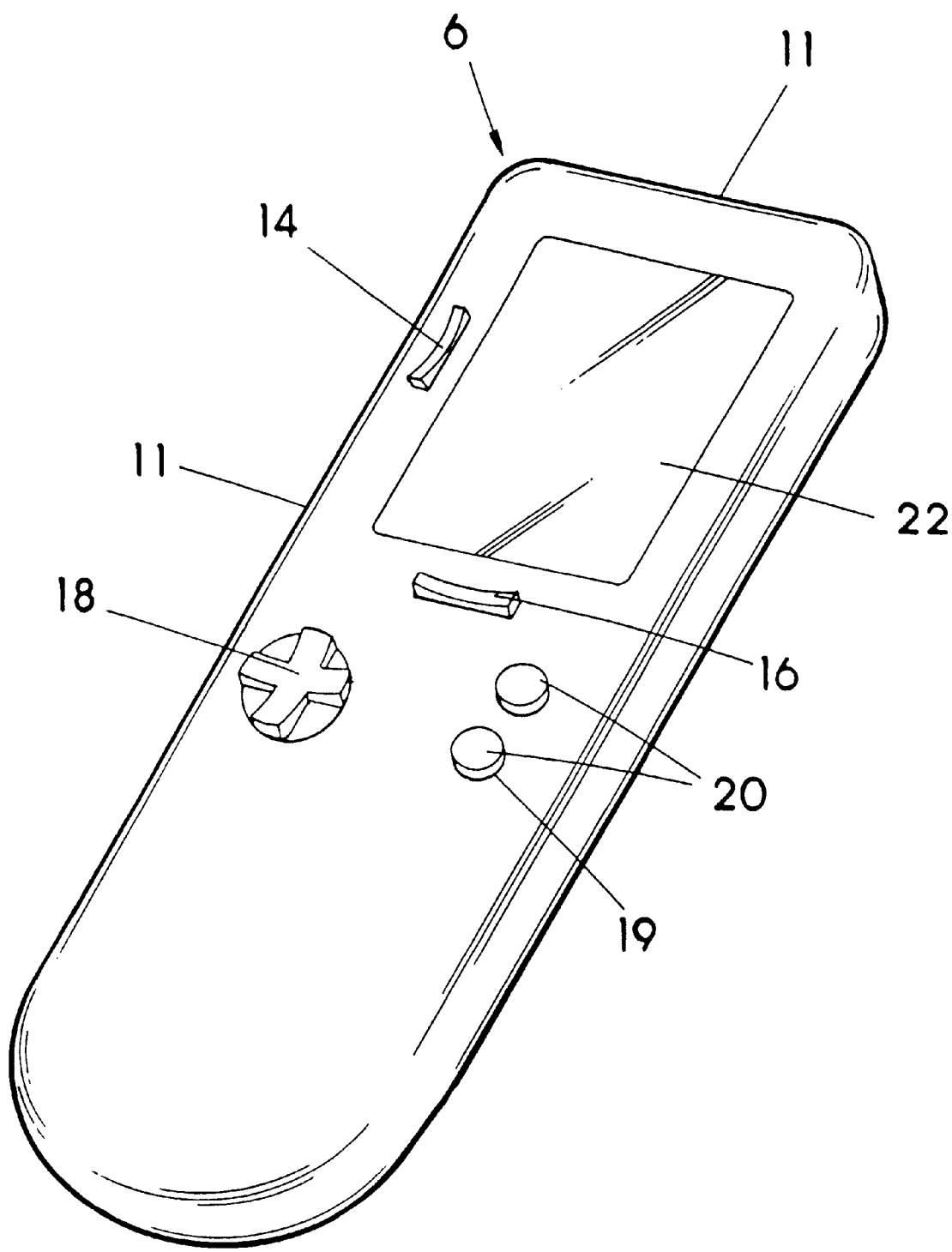
FIG. 8 shows a hand holdable remote controller in accordance with the present invention, including buttons of individual type and 2-way and 4-way type.

FIG. 8 shows a hand holdable remote controller 6 in accordance with the present invention. Shown is a housing 11 and a display 22 mounted within the housing 11. At the central left of the housing is shown a 4-way analog rocker 18. Shown at the mid-center of the housing is a 2-way analog rocker 16 which can serve as an X axis, horizontal control or scroller. Shown at the left side of the display on the housing is a 2-way analog rocker 14 which can serve as a Y axis, vertical control or scroller. Also shown, at the right adjacent the 4-way rocker are single buttons 19 and 20.

A mix of analog sensors and simple switches can be applied as desired in any of the illustrated embodiments, hybrids, combinations or modifications of the embodiments shown herein.

Figure 9:
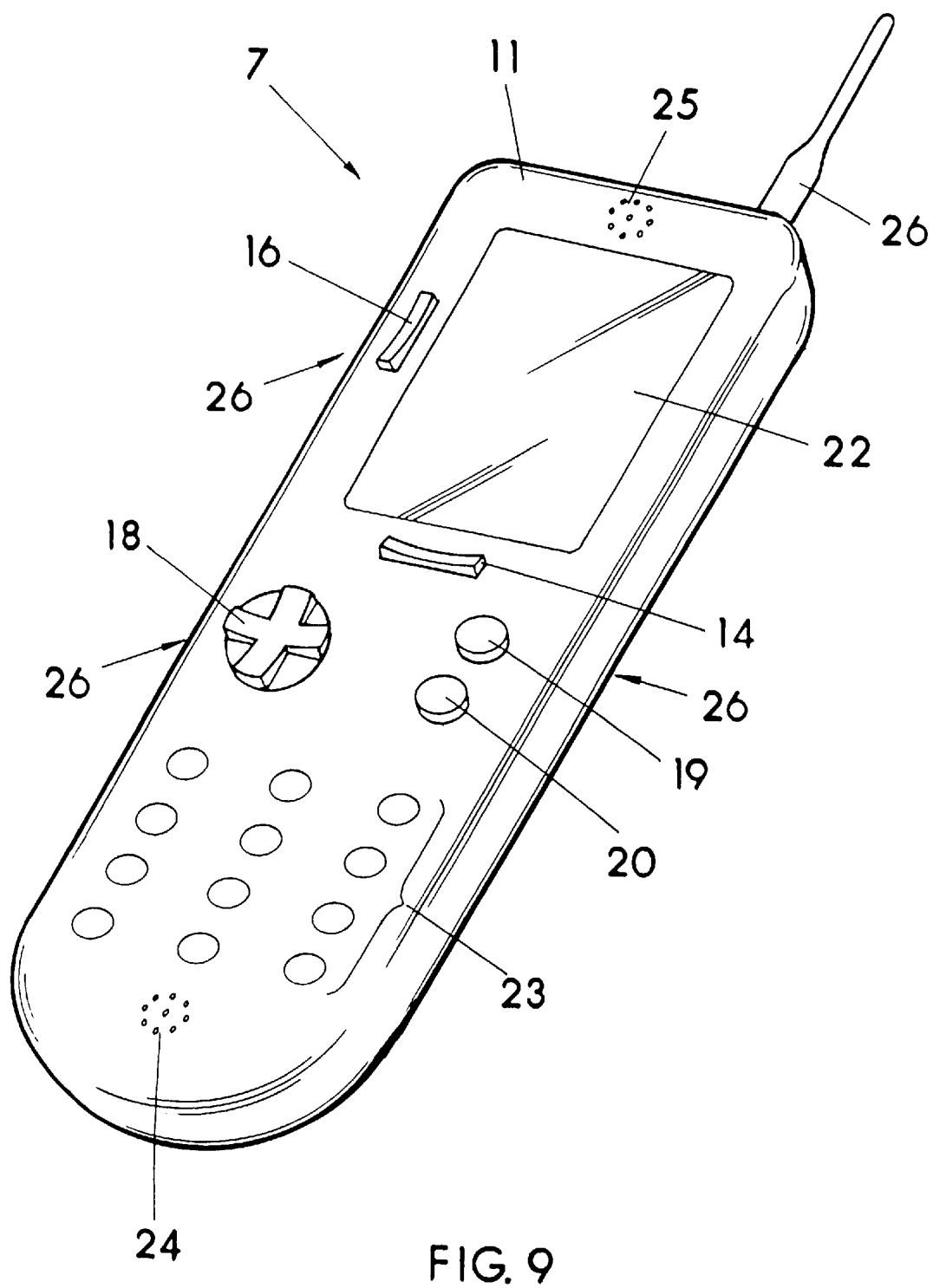
FIG. 9 shows a hand holdable telephone in accordance with the present invention, including buttons of individual type and 2-way and 4-way type.

FIG. 9 shows a hand holdable telephone 7 in accordance with the present invention. U.S. Class 379 contains prior art patents describing telephones of various types for those wishing more information thereon. Shown in FIG. 9 is a housing 11 and a display 22 mounted within the housing. At the central left of the housing 11 is shown a 4-way analog rocker 18. Shown at the mid-center of the housing is a 2-way analog rocker 16 which can serve as an X axis, horizontal control or scroller. Shown at the left side of the display on the housing is a 2-way analog rocker 14 which can serve as a Y axis, vertical control or scroller. Also shown, at the right adjacent the 4-way rocker 18 are single buttons 19 and 20. Shown at the bottom center of the housing is a keypad 23 for selecting or inputting numbers or letters. Also shown is a microphone 24, a speaker 25 and an antenna 26. It is anticipated that this telephone will have the traditional functions of a telephone and the additional ability to receive data, for example e-mail, stock prices, sports scores and general information which may be scrolled at variable rates desired by the user and selected by varying finger pressure on an analog sensor 26, thus maximizing the limited display area of a small display 22 such as is easily accommodated in a hand-held phone 7.

Figure 10:
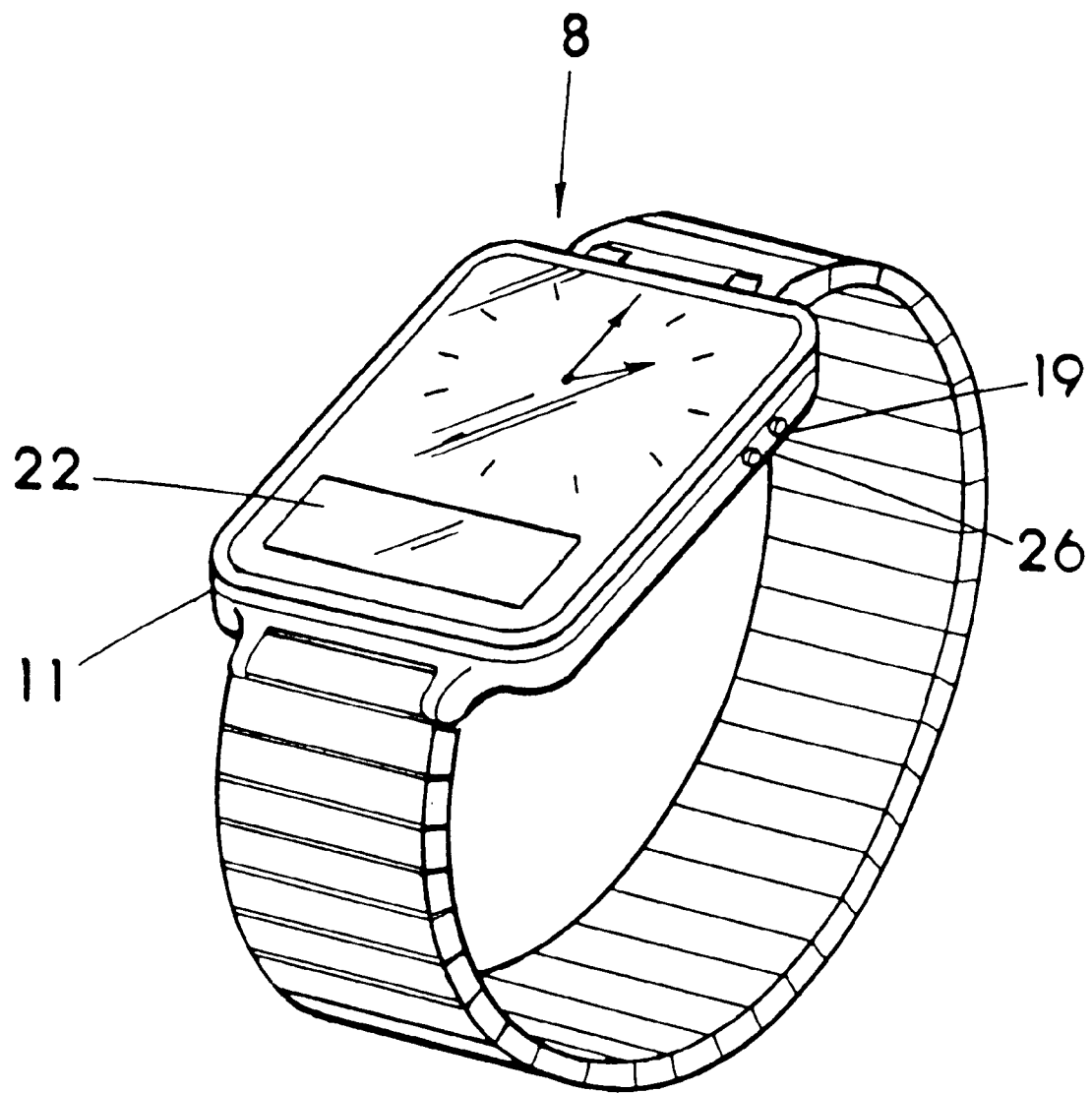
FIG. 10 shows a wrist watch in accordance with the present invention having a housing, a display within the housing, and at least one analog button.

FIG. 10 shows a wrist watch 8 in accordance with the present invention having a housing 11, a display 22 within the housing, and at least one analog button 19 (two buttons shown, the two buttons could be formed as a 2-way analog rocker) located on the right side of the housing. The analog buttons may be used to change the time/date or other information shown in the display. It is anticipated that significant benefit will be derived from being able to change the time/date at a variable user controlled rate dependant upon the pressure applied by the user to at least one analog button and possibly two buttons, one controlling change rate of ascending numbers, and the second button or the second end of a 2-way analog rocker controlling change rate of descending numbers. U.S. Class 368 contains many prior art patents describing time indicating watches and clocks for those wishing more information thereon.

Figure 11:
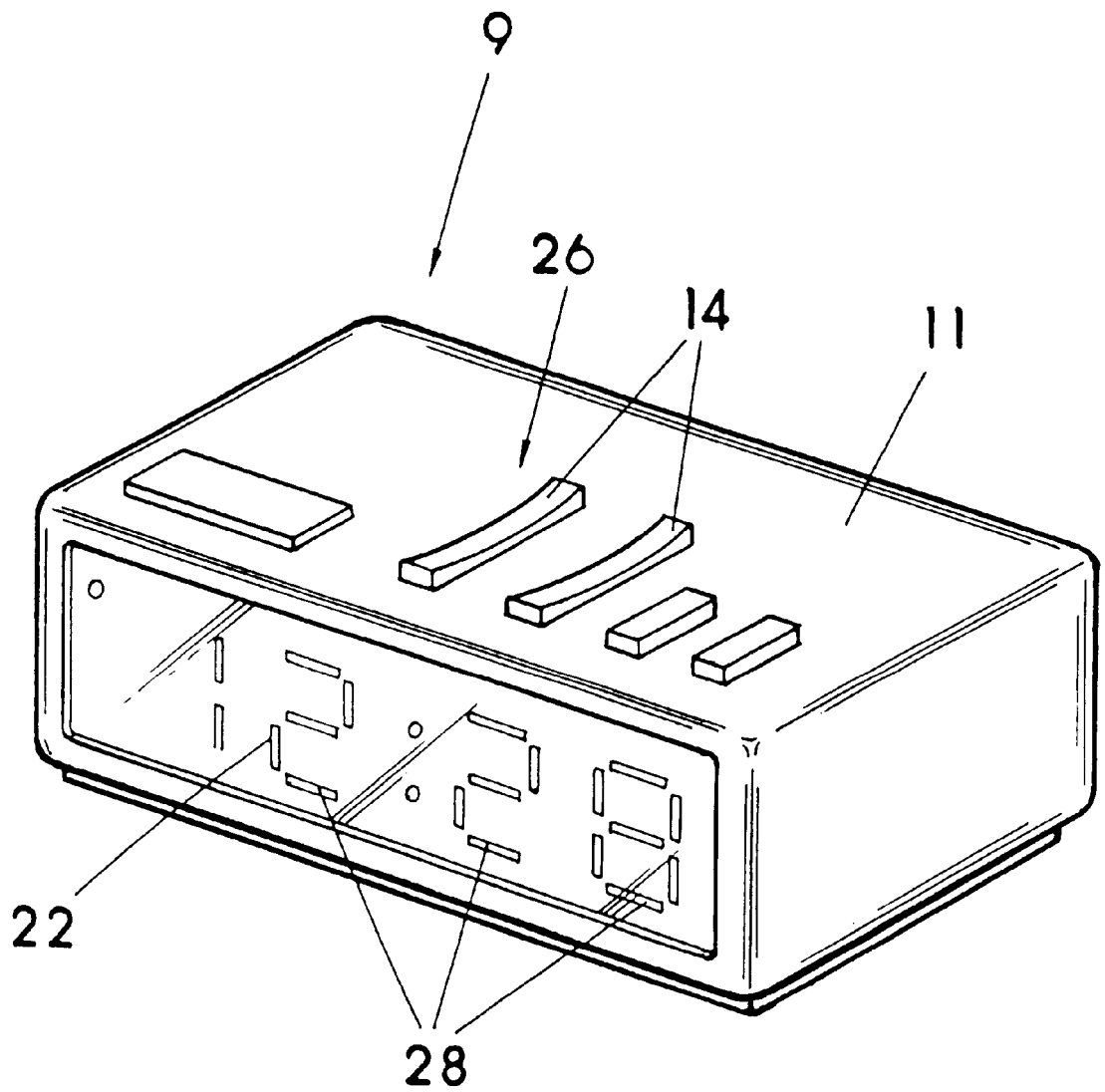
FIG. 11 shows a household clock in accordance with the present invention having a housing, a display within the housing, and at least one analog button.

FIG. 11 shows a household clock 9 in accordance with the present invention having a housing 11, a display 22 within the housing, and at least one analog button sensor 26 (two 2-way analog rockers 14 are shown) located on the top side of the housing 11. The analog rockers 14 may be used to change the time, such as bi-directionally, one rocker for minutes and the other for hours, or other information shown in the display 22. Also clock 9 could be manipulated or set by one rocker 14 for both hours and minutes, or by individual analog buttons (not shown). Display 22 is shown comprised of three seven segment numeric displays 28 which provide visual feedback as the human user sets the time. It is anticipated that significant benefit will be derived from being able to change the time indicated at a variable user controlled rate dependant upon the pressure applied by the user to at least one analog button and possibly two buttons, one controlling change rate of ascending numbers, and the second button or the second end of a 2-way analog rocker controlling change rate of descending numbers. One 2-way analog rocker is shown for changing hours, and one 2-way analog rocker is shown for changing minutes. With variable rate analog sensors, it is possible to have a very convenient controllable time change function with only a single analog button, because the high rate of change associated with high pressure applied by the user to a button can allow large time changes from minutes to hours in a convenient easy, quick manner for the user.

Figure 12:
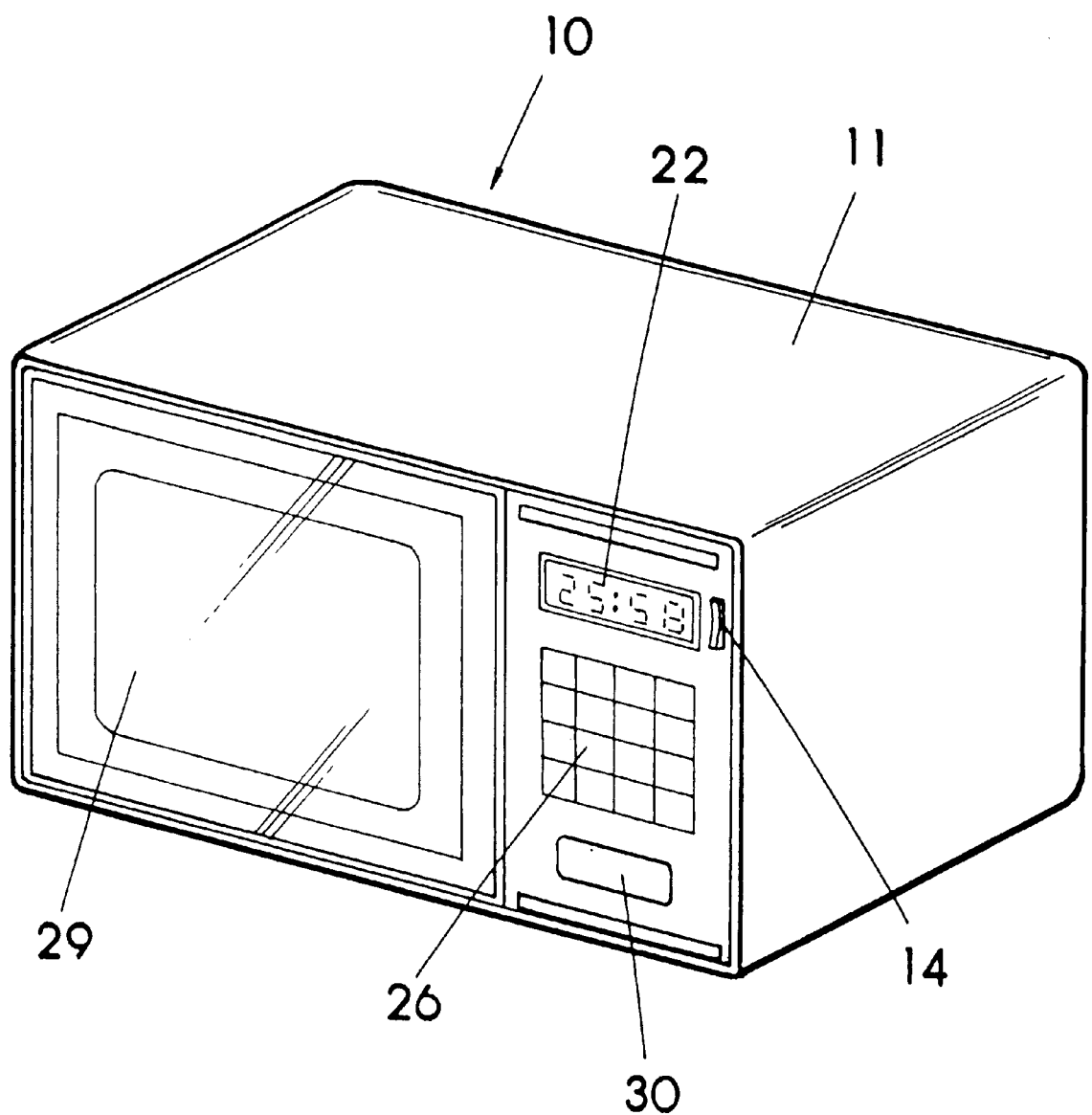
FIG. 12 shows a microwave oven or standard gas or electric oven in accordance with the present invention, the oven having a housing, a display within the housing, and at least one analog sensor.

FIG. 12 shows a microwave oven or standard gas or electric oven, oven 10 in accordance with the present invention. U.S. Classes 219, 426 contain prior art patents describing microwave ovens, while class 126 includes information of other types of prior art electric ovens for those wishing more information thereon. Shown in FIG. 12 is the oven 10 having a housing 11, a display 22 within the housing, and at least one analog button sensor 26 (one 2-way analog rocker 14 is shown and also the possibility of analog membrane sensors 26 are taught) located on the front face of the housing. Also shown is a door 29 with door release 30. The analog rocker/sensor(s) may be used to change the time or other information shown in the display 22. It is anticipated that significant benefit will be derived from being able to change the time indicated at a variable user controlled rate dependant upon the pressure applied by the user to at least one analog button and possibly two buttons, one controlling change rate of ascending numbers, and the second analog button or the second end of a 2-way analog rocker controlling change rate of descending numbers.

Figure 13:
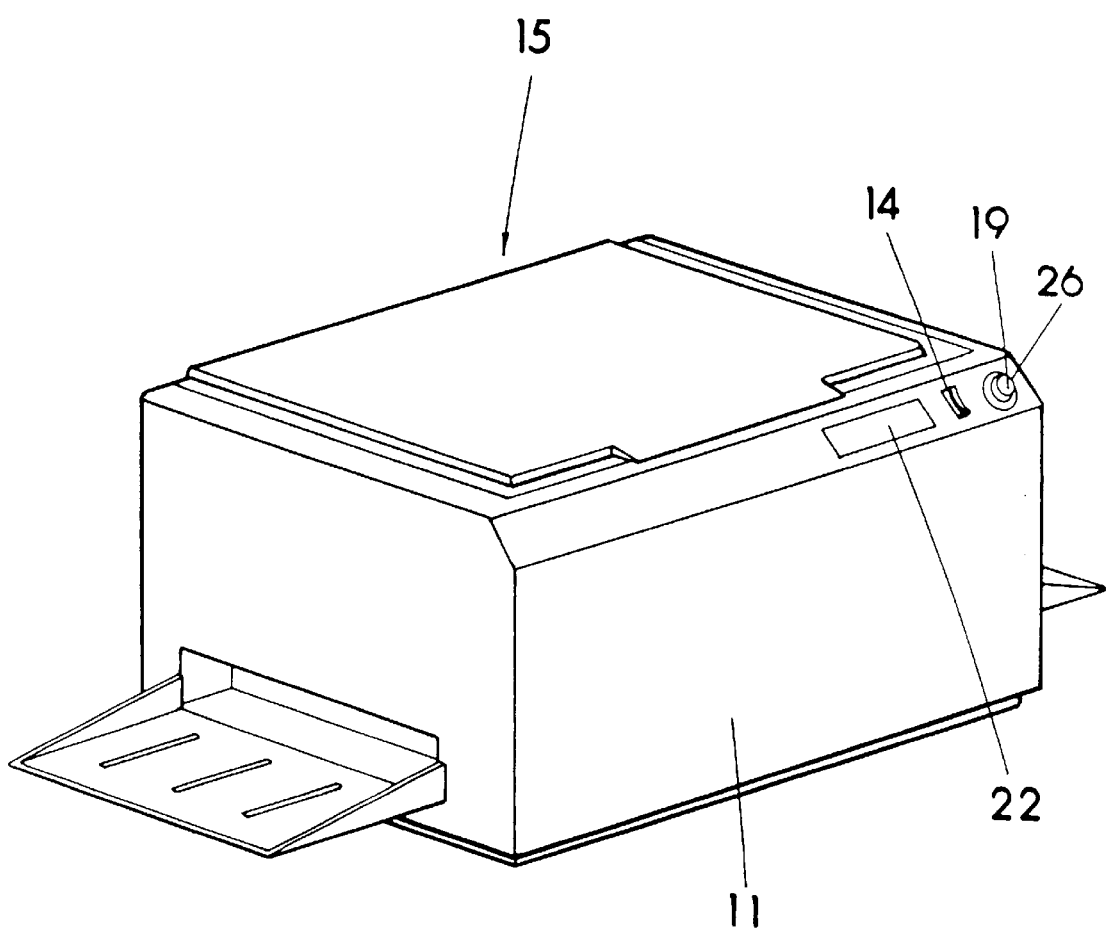
FIG. 13 shows a photocopy machine in accordance with the present invention. The photocopy machine has a housing, located on the upper side of the housing is a display and a 2-way analog rocker/analog button or analog membrane sensor(s).

FIG. 13 shows a photocopy machine 15 in accordance with the present invention. U.S. Class 355 contains many prior art patents describing photocopy machines for those wishing more information thereon. The photocopy machine 15 has a housing 11, located on the upper side of the housing is a display 22 and a 2-way analog rocker 14, analog button 19 or analog membrane sensor(s) 26. It is anticipated that an advantage is given to the user by being able to variably control the changing of the rate of selection of the number of copies to be made.

Figure 14:
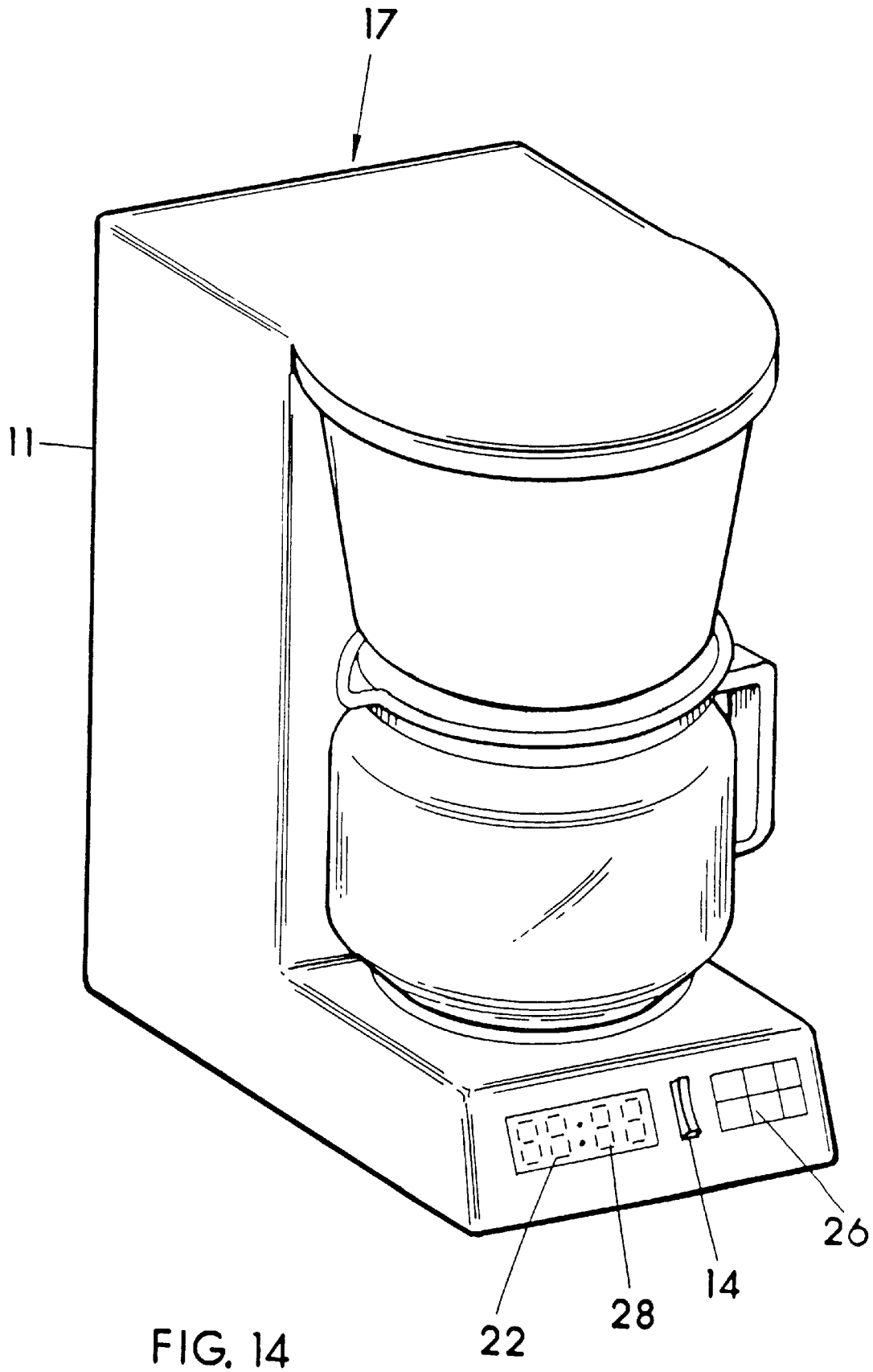
FIG. 14 shows a coffee maker in accordance with the invention. The coffee maker has a housing, a display located on the front lower portion of the housing, and a 2-way analog rocker or membrane analog sensors located on the housing adjacent to the display.

FIG. 14 shows a coffee brewing machine or maker 17 in accordance with the invention. U.S. Classes 099 and 210contain prior art patents describing coffee makers and the like for those wishing more information thereon. The coffee maker has a housing 11, a display 22 located on the front lower portion of the housing, and a 2-way analog rocker 14 or membrane analog sensors 26 located on the housing adjacent to the display. The analog rockers/buttons/membranes may be used to change the time or other information shown in the display. Display 22 is shown comprised of three seven segment numeric displays 28 which provide visual feedback as the human user sets the time. It is anticipated that significant benefit will be derived from being able to change the time indicated at a variable user controlled rate dependant upon the pressure applied by the user to at least one analog button and possibly two buttons, one controlling change rate of ascending numbers, and the second button or the second end of a 2-way analog rocker controlling change rate of descending numbers.

Figure 15:
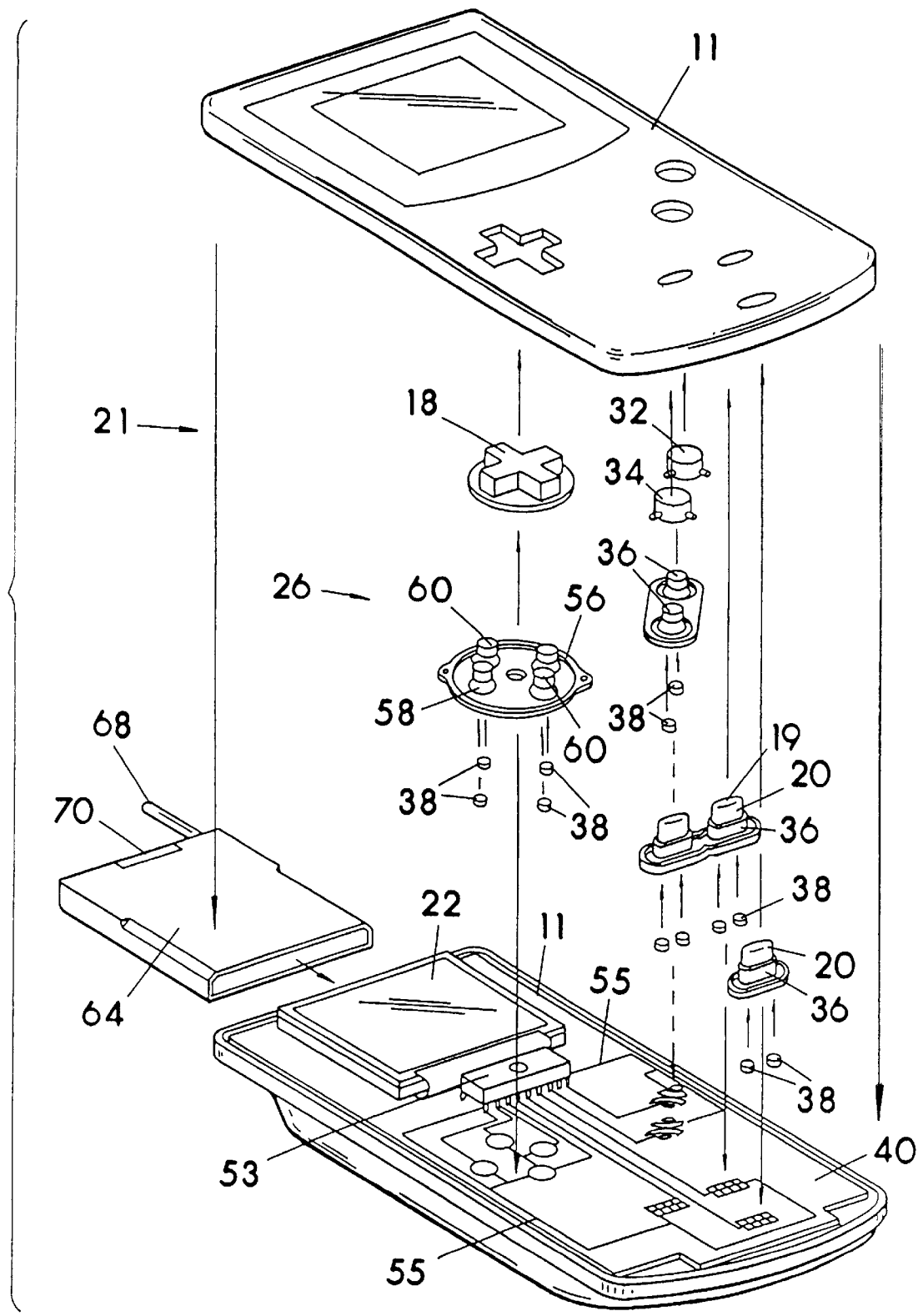
FIG. 15 shows an exploded view of a hand-held game system or PDA in accordance with the invention.

FIG. 15 shows an exploded view of a hand-held game system 2 or PDA 3 or other electronic device in accordance with the invention such as a pager, telephone, remote controller, GPS (global positioning receiver), web browser, TV, real time traffic mapper, wireless data terminal or the like.

FIG. 15 shows an exploded view in accordance with the present invention, including display 22 in a housing 11. Housing 11 additionally supports analog sensor 26 which may be structured as momentary-On switches 20 or as analog sensors 26 either in the 4-way rocker 18 structure or as single button 19 depressible surface. A 2-way analog rocker 14 or 16 can be installed. The 4-way rocker 18 is exposed through hole in the left hand area of housing 11, and the buttons 19 and 20 are exposed through holes in the right hand area of housing 11. The holes allow exposure of depressible surfaces of analog sensors 26 or buttons 20 which are momentary-On switches for "start", "select" functions and an "analog" toggling button for changing the state between analog mode and binary mode of operation, whereby the user may select, for example, 4-way rocker 18 and/or buttons 19 or 20 to be either momentary-On switches or analog output sensors 26 selecting how the information received from the sensors 26 or buttons 20 is processed by circuitry 53 which preferably includes ASIC circuitry. Sensors 26 or material 38 thereof interact with circuit traces 55 on the circuit board 40 contained within housing 11. Circuit board 40 also supports circuitry 53 connected to the circuit traces 55, display 22 and removable module 64. Numerous structures of analog sensors 26 are shown including circuit board 40, traces 55 analog material 38 (pressure-sensitive variable-conductive material), rubber dome caps 60 (or 36 in the 2-way or single button in FIG. 15) and depressible surfaces or surface areas as parts of both a thumb (digit) depressible 4-way rocker 18 and individually thumb depressible buttons. Module 64 is positioned to be inserted into a module receiving socket in the housing 11. Within the scope of this invention, module 64 can be structured with a electromagnetic receiver and/or transmitter such as indicated by RF antenna 68 or IR (infrared) receiver and/or transmitter 70 in combination with RAM memory and possibly other circuitry within module 64 enabling module 64 to function in a great diversity of applications such as module 64 may enable a paging function, telephone function, GPS function, wireless web browser, remote controller function for controlling television and/or set-top box, and programable memory containing any suitable software, data, suitable circuitry and the like.

Figure 16:
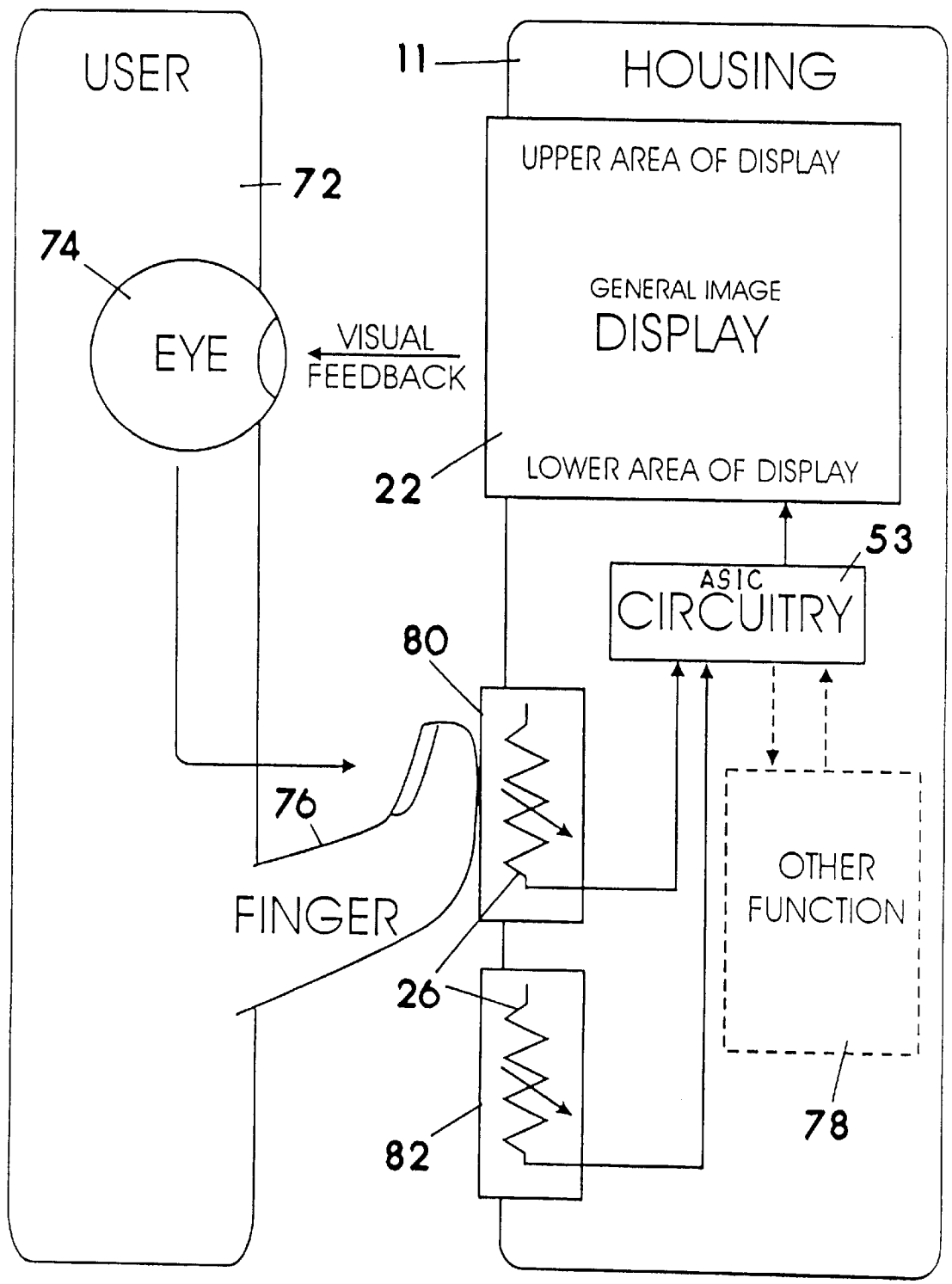
FIG. 16 shows a block diagram in accordance with the invention.
Figure 17:
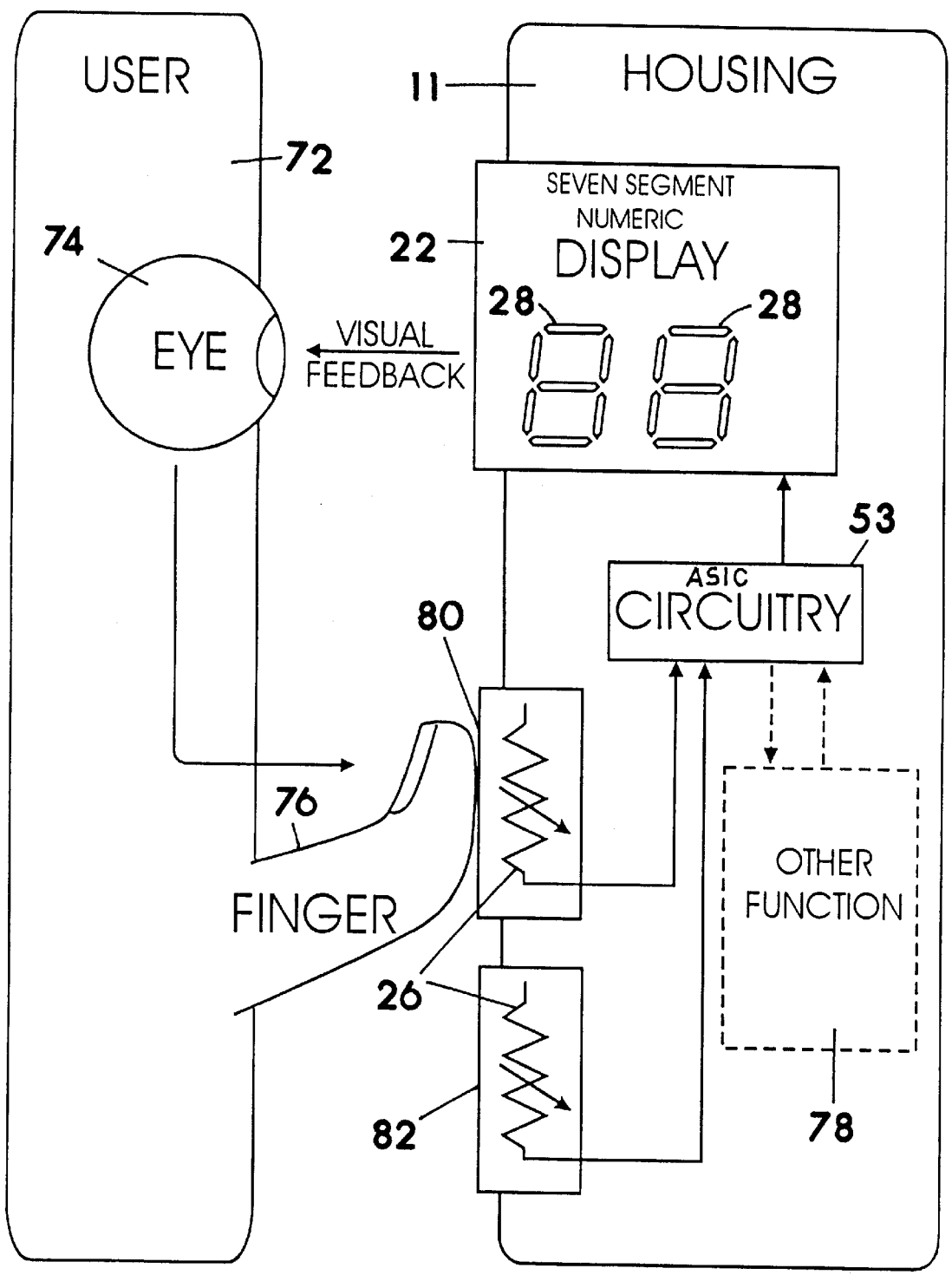
FIG. 17 shows a block diagram in accordance with the invention.
Figure 18:
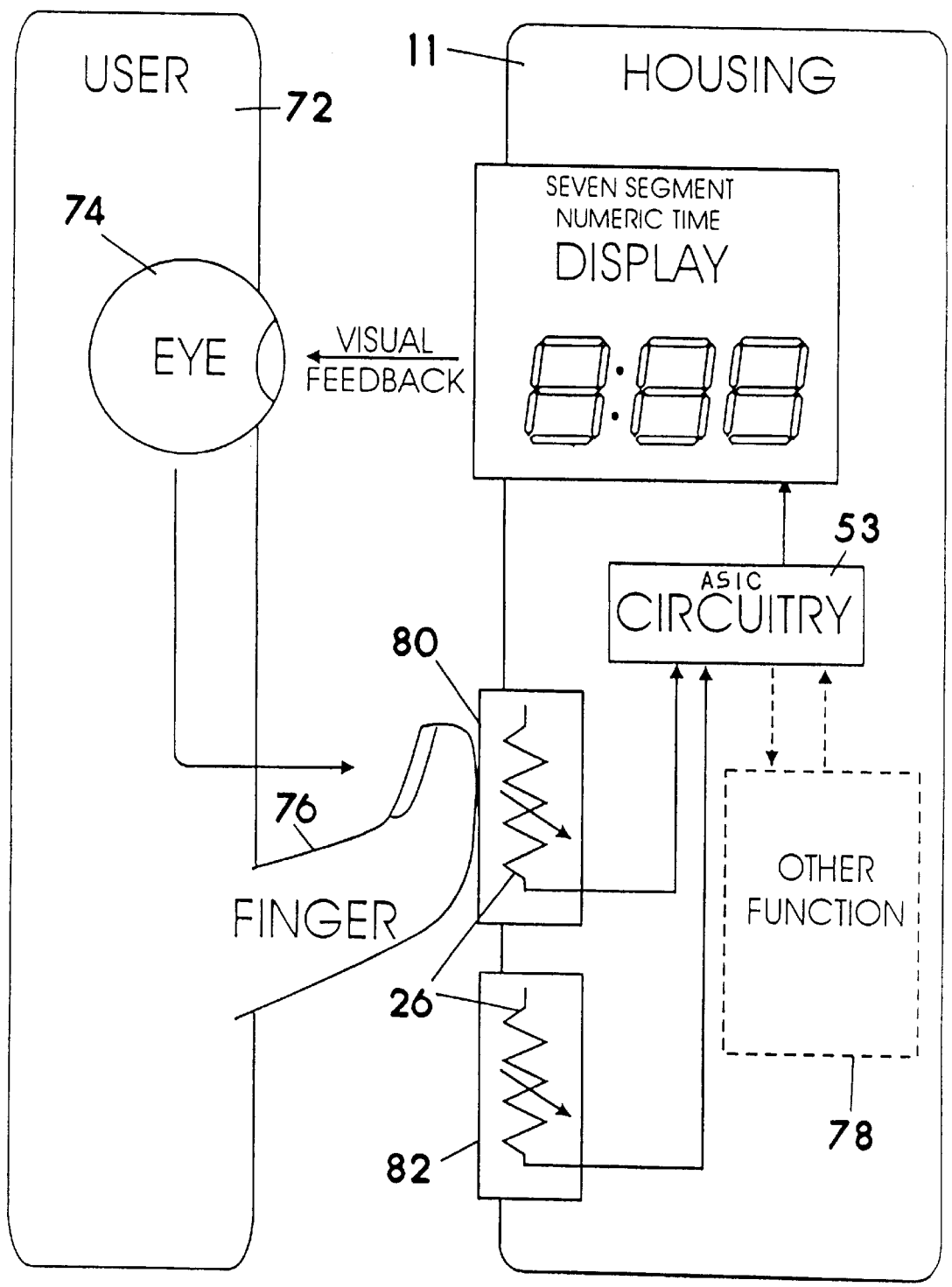
FIG. 18 shows a block diagram in accordance with the invention.

FIGS. 16–18 show block diagrams in accordance with the invention. Illustrated is a housing 11 containing two sensors 26, one sensor 26 having depressible surface 80 and the other sensor 26 having depressible surface 82. The sensors 26 are connected to circuitry 53 connected to a display 22. Also illustrated is a box representing a human user 72 with the user's eye 74 receiving visual feedback from display 22. The visual feedback received by the eye 74 at least in part influences the depressive pressure exerted by the user's finger 76 against sensor 26 which in turn is read by circuitry 53 which controls the visual feedback displayed on display 22, thus a closed loop feedback system is established in which the user 72 receives immediate feedback concerning the control of the electronic device according to the invention. The state of circuitry 53, as controlled by the user, can control other functions 78 of the electronic device.

FIG. 16 shows display 22 as a general image display. The general image display 22 of FIG. 16 includes an upper area and a lower area, thus a user may scroll data at varying rates from the lower area to the upper area by pressing surface 80, and from the upper area to the lower area by pressing surface 82.

FIG. 17 shows display 22 having two seven segment numeric displays 28, thus the user may select numbers at a variable rate by varying depression on sensors 26. For example, such selection may be for number of copies to be made by a photocopy machine 15, temperature setting of a thermostat, channel number on a television and the like. Depression of surface 80 is arranged in this example to cause a variable rate of ascending numbers according to the level of depressive pressure applied to surface 80. Depression of surface 82 is arranged in this example to cause a variable rate of descending numbers according to the level of depressive pressure applied to surface 82.

FIG. 18 shows display 22 having three seven segment numeric displays 28 as are commonly used in time displays. Thus the user may select at a variable rate, numbers representing timing, by varying depression on sensors 26. In FIG. 18, depression of surface 80 is arranged in this example to cause a variable rate of ascending numbers representing time according to the level of depressive pressure applied to surface 80, and depression of surface 82 is arranged in this example to cause a variable rate of descending numbers according to the level of depressive pressure applied to surface 82, or surfaces 80 and 82 can be arranged to control hours and minutes individually. Clearly a clock can be greatly advantaged by ascending and descending sensors 26 for both hours and minutes adjustments.

The present electronic devices utilize analog sensors and circuitry for reading at least three readable states, analog values or conductance levels of each of the analog sensors; the states, values, levels or the like may be or can be varied voltages or currents (example only), and are varied dependant upon depressive pressure applied to a finger depressible button associated with each analog sensor. Button may be herein treated as the finger depressible area of a rocker member such as a 2-way or 4-way or the like. The associated circuitry is structured to read an immediate, instant or current state or value of the analog sensors and to communicate representative control signals. The at least three states of the active element (analog sensor) can represent at least: 1) no pressure, 2low pressure, and 3) high pressure applied to the depressible surface by the human user's finger or thumb (digit), the 3 level equating to rates of change. The analog sensor and circuitry arrangement can be employed in a manner wherein not just three but many states are read, thus ensuring high resolution reading of a variably changing depressive button pressure input. Preferably, many different user determinable rates (many different states rate by the circuitry) are provided between low and high pressure on the associated button so that the user is provided, for example, very slow, slow, medium, fast and very fast change rates. With the analog sensors, the user is provided variable change rate control dependant upon the degree of depressive pressure he or she applies to the button associated with the analog sensor(s) which is indicated or made visually detectable on the display at least at the time the analog sensor is being depressed, and this to allow the intelligent application of finger pressure by the user to the analog sensor. Based on the information shown on the associated display, the user can choose to increase, decrease or terminate finger pressure on the analog sensor. Such an arrangement provides the user vastly improved control by allowing the user to apply low pressure to have a slow rate of change, or to apply high pressure to initiate very rapid change, and then to reduce the applied pressure to the button to reduce the rate of change in order to stop easily and precisely on a desired target or within a desired area, such precise control is clearly advantageous and desirable.

The invention can be viewed or defined in numerous ways including structure and methods as those skilled in the art will realize upon a reading of this disclosure presented to exemplify rather than limit the invention. Thus, the invention should be defined by the broadest possible interpretation of the claims.

I claim:

1. A hand holdable electronic device for controlling imagery, comprising:
   a housing sized to be hand-held;
   electronic circuitry located in said housing;
   a general image display located in said housing, said general image display operatively connected to said circuitry;
   at least one finger depressible surface in part exposed on said housing, said at least one finger depressible surface operatively connected to
   at least one pressure-sensitive analog sensor, said pressure-sensitive analog sensor for inputting a signal to said circuitry, said signal having variable value depending on variable pressure applied to said at least one finger depressible surface;
   said circuitry structured to receive said signal and to cause said general image display to provide variable visual feedback data, said variable visual feedback data at least in part representing the variable pressure applied to said at least one finger depressible surface, whereby said variable visual feedback data may be controlled at varying rates according to variable pressure applied to said at least one finger depressible surface.

2. A hand holdable electronic device according to claim 1 wherein said at least one finger depressible surface is a first depressible surface, said electronic device further includes a finger depressible surface which is a second depressible surface in part exposed on said housing, said second depressible surface operatively connected to
   a second pressure-sensitive analog sensor, said second pressure-sensitive analog sensor for inputting a second signal to said circuitry, said second signal having variable value depending on variable pressure applied to said second depressible surface;
   said circuitry structured to receive said second signal and to cause said general image display to provide variable visual feedback data, said variable visual feedback data at least in part representing the variable pressure applied to said second depressible surface, whereby said variable visual feedback data may be scrolled at varying rates according to variable pressure applied to said second depressible surface.

3. A hand holdable electronic device according to claim 2 wherein said first depressible surface and said second depressible surface are thumb depressible single individual buttons.

4. A hand holdable electronic device according to claim 3 wherein the pressure-sensitive analog sensors are structured to provide tactile feedback.

5. A hand holdable electronic device according to claim 3 wherein said hand holdable electronic device is a personal digital assistant.

6. A hand holdable electronic device according to claim 5 wherein the pressure-sensitive analog sensors are structured to provide tactile feedback.

7. A hand holdable electronic device according to claim 3 wherein said hand holdable electronic device is a telephone.

8. A hand holdable electronic device according to claim 7 wherein the pressure-sensitive analog sensors are structured to provide tactile feedback.

9. A hand holdable electronic device according to claim 3 wherein said hand holdable electronic device is a hand-held game system, and said thumb depressible single individual buttons are located in a right hand area of said housing.

10. A hand holdable electronic device according to claim 9 wherein the pressure-sensitive analog sensors are structured to provide tactile feedback.

11. A hand holdable electronic device according to claim 10 wherein the pressure-sensitive analog sensors are structured with resilient dome caps, said dome caps providing said tactile feedback.

12. A hand holdable electronic device according to claim 3 wherein said hand holdable electronic device is a hand-held global positioning receiver.

13. A hand holdable electronic device according to claim 12 wherein the pressure-sensitive analog sensors are structured to provide tactile feedback.

14. A hand holdable electronic device according to claim 3 wherein said hand holdable electronic device is a hand-held wireless web browser.

15. A hand holdable electronic device according to claim 14 wherein the pressure-sensitive analog sensors are structured to provide tactile feedback.

16. A hand holdable electronic device according to claim 3 wherein said hand holdable electronic device is a hand-held remote controller.

17. A hand holdable electronic device according to claim 16 wherein the pressure-sensitive analog sensors are structured to provide tactile feedback.

18. A hand holdable electronic device according to claim 3 wherein said hand holdable electronic device is a pager.

19. A hand holdable electronic device according to claim 18 wherein the pressure-sensitive analog sensors are structured to provide tactile feedback.

20. A device for controlling time imagery, comprising:
a housing;
electronic circuitry located in said housing, said electronic circuitry at least calculating units of time;
a time display located in said housing, said time display having at least three seven-element numeric displays, said time display operatively connected to said circuitry; said time display displaying time information;
at least one finger depressible surface in part exposed on said housing, said at least one finger depressible surface operatively connected to
at least one pressure-sensitive variable-conductance analog sensor, said pressure-sensitive analog sensor for inputting a signal to said circuitry, said signal having variable value depending on variable pressure applied to said at least one finger depressible surface;
said circuitry structured to receive said signal and to cause said time display to provide visual feedback time information, said visual feedback time information changeable at a variable rate representing the variable pressure applied to said at least one finger depressible surface.

21. A device according to claim 20 wherein said at least one finger depressible surface is a first depressible surface, said electronic device further includes a finger depressible surface which is a second depressible surface in part exposed on said housing, said second depressible surface operatively connected to
a second pressure-sensitive analog sensor, said second pressure-sensitive variable-conductance analog sensor for inputting a second signal to said circuitry, said second signal having variable value depending on variable pressure applied to said second depressible surface;
said circuitry structured to receive said second signal and to cause said time display to provide visual feedback time information changeable at a variable rate representing the variable pressure applied to said second depressible surface.

22. A device according to claim 21 wherein said first depressible surface and said second depressible surface are depressible single individual buttons.

23. A device according to claim 22 wherein the pressure-sensitive analog sensors are structured to provide tactile feedback.

24. A device according to claim 22 wherein said device is a household clock.

25. A device according to claim 24 wherein the pressure-sensitive analog sensors are structured to provide tactile feedback.

26. A device according to claim 22 wherein said device is a coffee maker.

27. A device according to claim 26 wherein the pressure-sensitive analog sensors are structured to provide tactile feedback.

28. A device according to claim 22 wherein said device is an oven.

29. A device according to claim 28 wherein the pressure-sensitive analog sensors are structured to provide tactile feedback.

30. A device according to claim 28 wherein said oven is a microwave oven.

31. A device according to claim 30 wherein the pressure-sensitive analog sensors are structured to provide tactile feedback.

32. A device for controlling imagery, comprising:
pressure-sensitive variable-conductance analog sensor for creating a varying analog value according to varying depression applied by a finger of a user to said analog sensor; associated with said analog sensor is
means for providing tactile feedback to the finger;
circuitry connected to said analog sensor, said circuitry for reading a varying analog value from said analog sensor and causing representative varying of imagery.

33. A device according to claim 32 wherein said analog sensor is a first analog sensor, said device further includes a second analog sensor, said second analog sensor connected to said circuitry for causing variable control of the imagery.

34. A device according to claim 33 wherein said means for providing tactile feedback comprises means for active tactile feedback.

35. A device according to claim 33 wherein said means for providing tactile feedback comprises a resilient dome cap supplying a break-over threshold tactile feedback to the finger.

36. A device according to claim 35 wherein said means for providing tactile feedback also comprises active tactile feedback.

37. A device according to claim 36 wherein said first analog sensor and said second analog sensor are activated by thumb depressible single individual buttons located in a right-hand area of a housing.

38. A device according to claim 35 wherein a display is supported by a housing, said display showing the imagery, said housing structured to at least part support the analog sensors.

39. A device according to claim 38 wherein said display is a general image display.

40. A device according to claim 39 wherein said device is a personal digital assistant, and said housing is a hand-held housing.

41. A device according to claim 39 wherein said device is a telephone.

42. A device according to claim 39 wherein said device is a hand-held game system, and said first analog sensor and said second analog sensor are activated by thumb depressible single individual buttons located in a right hand area of said housing.

43. A device according to claim 39 wherein said device is a hand-held global positioning receiver.

44. A device according to claim 39 wherein said device is a wireless web browser.

45. A device according to claim 39 wherein said device is a remote controller.

46. A device according to claim 39 wherein said device is a hand-held pager.

47. A device according to claim 34 wherein said display is a time display, said time display having at least three seven-element numeric displays, said time display displaying time information.

48. A device according to claim 47 wherein said device is a coffee maker.

49. A device according to claim 47 wherein said device is a household clock.

50. A device according to claim 47 wherein said device is an oven.

51. A device according to claim 50 wherein said oven is a microwave oven.

* * * * *

(12) INTER PARTES REEXAMINATION CERTIFICATE (0102nd)
United States Patent
Armstrong

(10) Number: US 6,347,997 C1
(45) Certificate Issued: *Sep. 15, 2009

(54) ANALOG CONTROLS HOUSED WITH ELECTRONIC DISPLAYS

(75) Inventor: Brad A. Armstrong, Paradise, CA (US)

(73) Assignee: Anascape, Ltd., Tyler, TX (US)

Reexamination Request:
No. 95/000,214, Apr. 24, 2007

Reexamination Certificate for:
Patent No.: 6,347,997
Issued: Feb. 19, 2002
Appl. No.: 09/568,662
Filed: May 10, 2000

(*) Notice: This patent is subject to a terminal disclaimer.

Related U.S. Application Data

(63) Continuation-in-part of application No. 08/942,450, filed on Oct. 1, 1997, now Pat. No. 6,102,802.

(51) Int. Cl.
  *A63F 9/24* (2006.01)
  *A63F 13/00* (2006.01)
  *G06F 17/00* (2006.01)
  *G06F 19/00* (2006.01)

(52) U.S. Cl. .......................................... 463/37
(58) Field of Classification Search ................ None
   See application file for complete search history.

(56) References Cited

U.S. PATENT DOCUMENTS

| | | | |
|---|---|---|---|
| 3,806,471 A | 4/1974 | Mitchell | |
| 4,766,271 A | 8/1988 | Mitsuhashi et al. | |
| RE34,095 E | 10/1992 | Padula et al. | |
| 5,164,697 A | 11/1992 | Kramer | |
| 5,207,426 A | 5/1993 | Inoue et al. | |
| 5,510,812 A | 4/1996 | O'Mara et al. | |
| 5,669,818 A | 9/1997 | Thorner et al. | |

FOREIGN PATENT DOCUMENTS

| | | |
|---|---|---|
| EP | 0 835676 A1 | 4/1998 |
| JP | S61-103836 | 7/1986 |
| JP | S62-82090 | 12/1989 |
| JP | H05-87760 | 11/1993 |
| JP | H05-326217 | 12/1993 |

OTHER PUBLICATIONS

Logitech, Inc, "CyberMan 3D Controller" © 1993.
John R. Mason, "Switch Engineering Handbook" © 1993, McGraw–Hill, Inc.

*Primary Examiner*—Beverly M. Flanagan

(57) ABSTRACT

Devices for controlling imagery shown by a display, and including an analog sensor for creating a varying analog value according to varying depression applied by a finger of a human user to the analog sensor. Multiple analog sensors are sometimes utilized. In one preferred embodiment the analog sensor(s) includes a resilient dome cap for providing tactile feedback to the finger depressing the analog sensor. Circuitry within a housing is connected to the analog sensor for reading the varying analog value from the analog sensor and causing representative varying the imagery shown by the display. The devices can be individually structured as electronic game controllers/systems, telephones, pagers, electronic books, web browsers, global positioning receivers, ovens, coffee makers and personal digital assistants (PDA) to name a few.

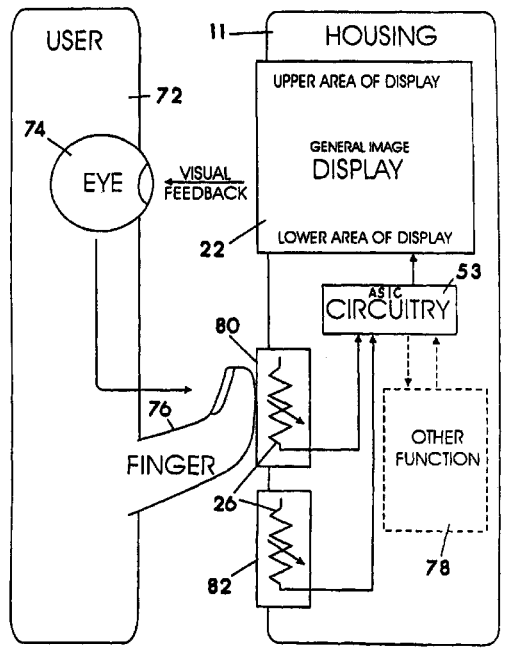

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 32–37 are cancelled.

Claims 1–31 and 38–51 were not reexamined.

\* \* \* \* \*